US012472938B2

(12) United States Patent
Nakashima

(10) Patent No.: US 12,472,938 B2
(45) Date of Patent: Nov. 18, 2025

(54) MOVING BODY CONTROL DEVICE, MOVING BODY CONTROL METHOD, AND MOVING BODY STORAGE MEDIUM

(71) Applicant: HONDA MOTOR CO., LTD., Tokyo (JP)

(72) Inventor: Hiroyuki Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 18/495,211

(22) Filed: Oct. 26, 2023

(65) Prior Publication Data

US 2024/0140404 A1    May 2, 2024

(30) Foreign Application Priority Data

Oct. 28, 2022   (JP) .................................. 2022-172983

(51) Int. Cl.
| | |
|---|---|
| *B60W 30/06* | (2006.01) |
| *G06V 10/60* | (2022.01) |
| *G06V 10/74* | (2022.01) |
| *G06V 20/58* | (2022.01) |

(52) U.S. Cl.
CPC ............. *B60W 30/06* (2013.01); *G06V 10/60* (2022.01); *G06V 10/74* (2022.01); *G06V 20/586* (2022.01); *B60W 2540/215* (2020.02)

(58) Field of Classification Search
CPC ....... H04N 23/71; H04N 25/61; B60W 30/06; B60W 2540/215; G06V 10/74; G06V 10/60; G06V 20/586
See application file for complete search history.

(56) References Cited

U.S. PATENT DOCUMENTS

| | | | |
|---|---|---|---|
| 2010/0231712 A1* | 9/2010 | Suenobu ................ | H04N 23/71 348/135 |
| 2014/0112528 A1* | 4/2014 | King ...................... | G06V 20/59 382/103 |
| 2020/0167573 A1* | 5/2020 | Song .................... | H04N 23/741 |
| 2020/0242936 A1 | 7/2020 | Matsunaga et al. | |
| 2020/0285861 A1* | 9/2020 | Kato ........................ | B60M 7/00 |

FOREIGN PATENT DOCUMENTS

JP     2020-117128 A    8/2020

* cited by examiner

*Primary Examiner* — Kenneth J Malkowski
(74) *Attorney, Agent, or Firm* — Paratus Law Group, PLLC

(57) ABSTRACT

A moving body control device includes: an external environment recognition unit, a reception unit, and a control unit. The control unit registers a feature related to a designated parking position based on recognition data of an external environment of a moving body as a registered feature, and performs an automatic parking control for parking the moving body at the designated parking position based on the recognition data and the registered feature. The control unit updates the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

14 Claims, 18 Drawing Sheets

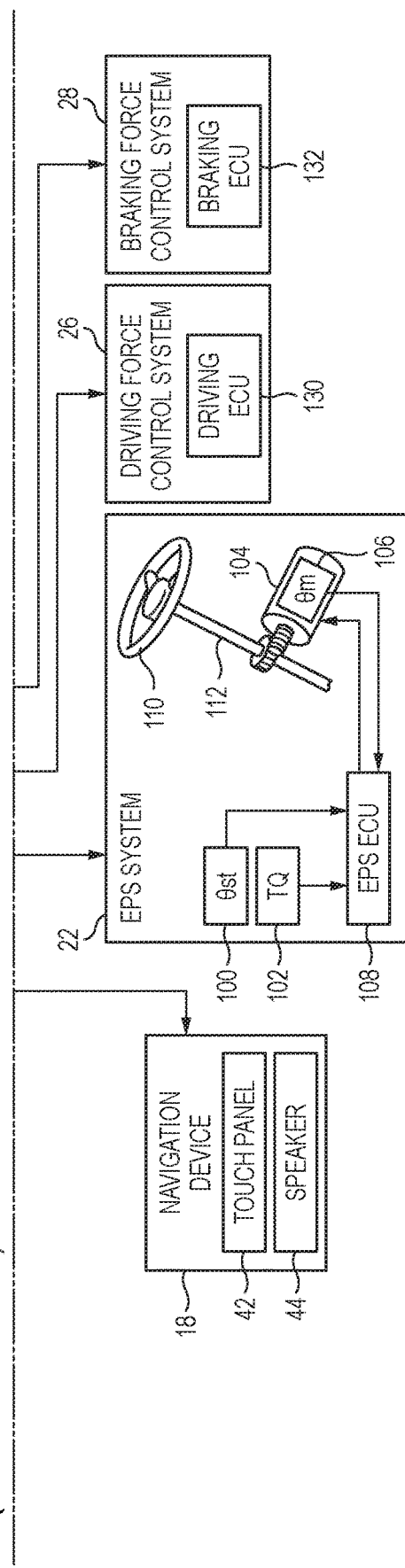

| SLOT | MAP (MAP OF FEATURES AND PARKING POSITION) |
|---|---|
| DAYTIME | MAP a |
| NIGHTTIME | MAP b |

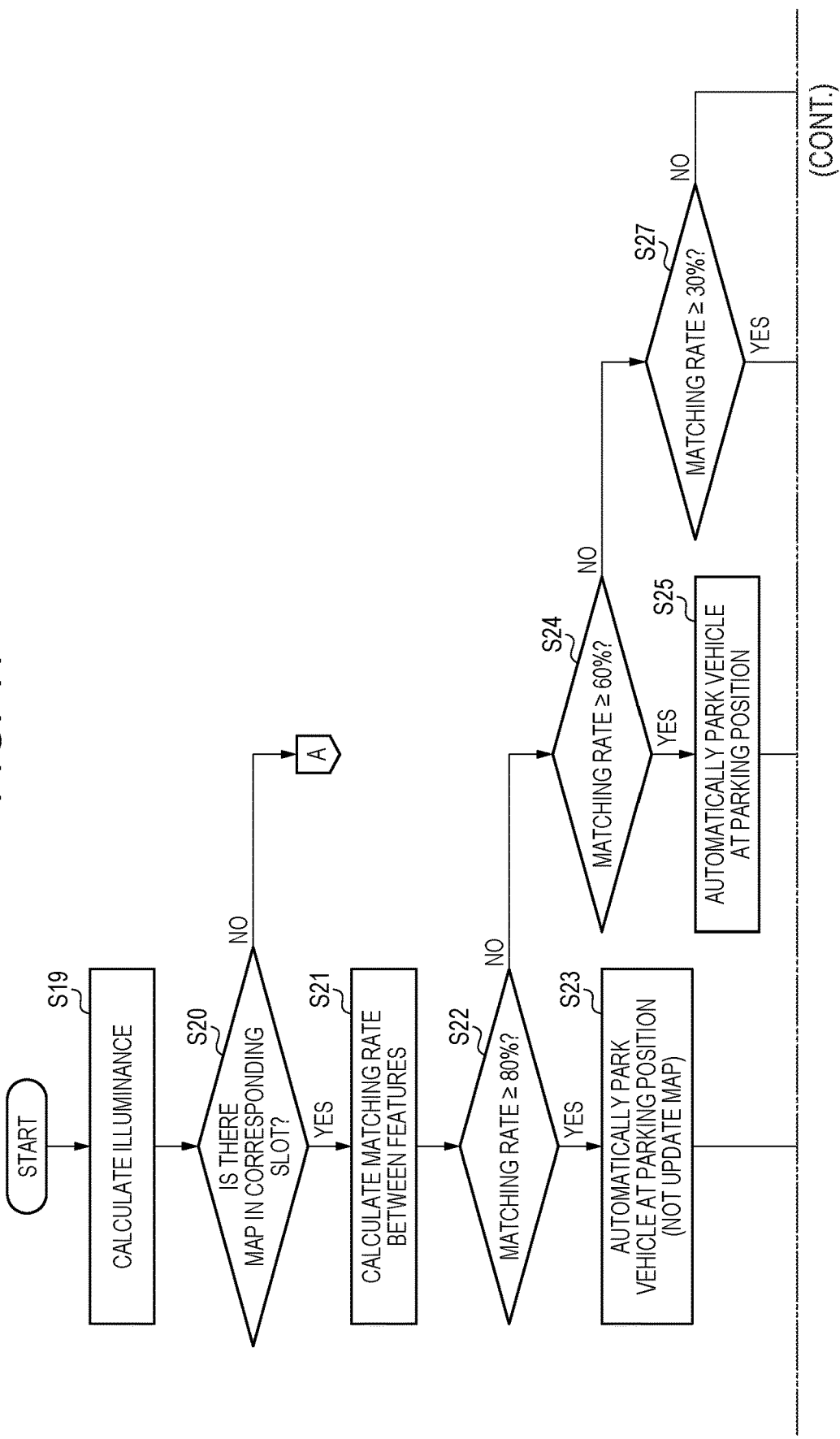

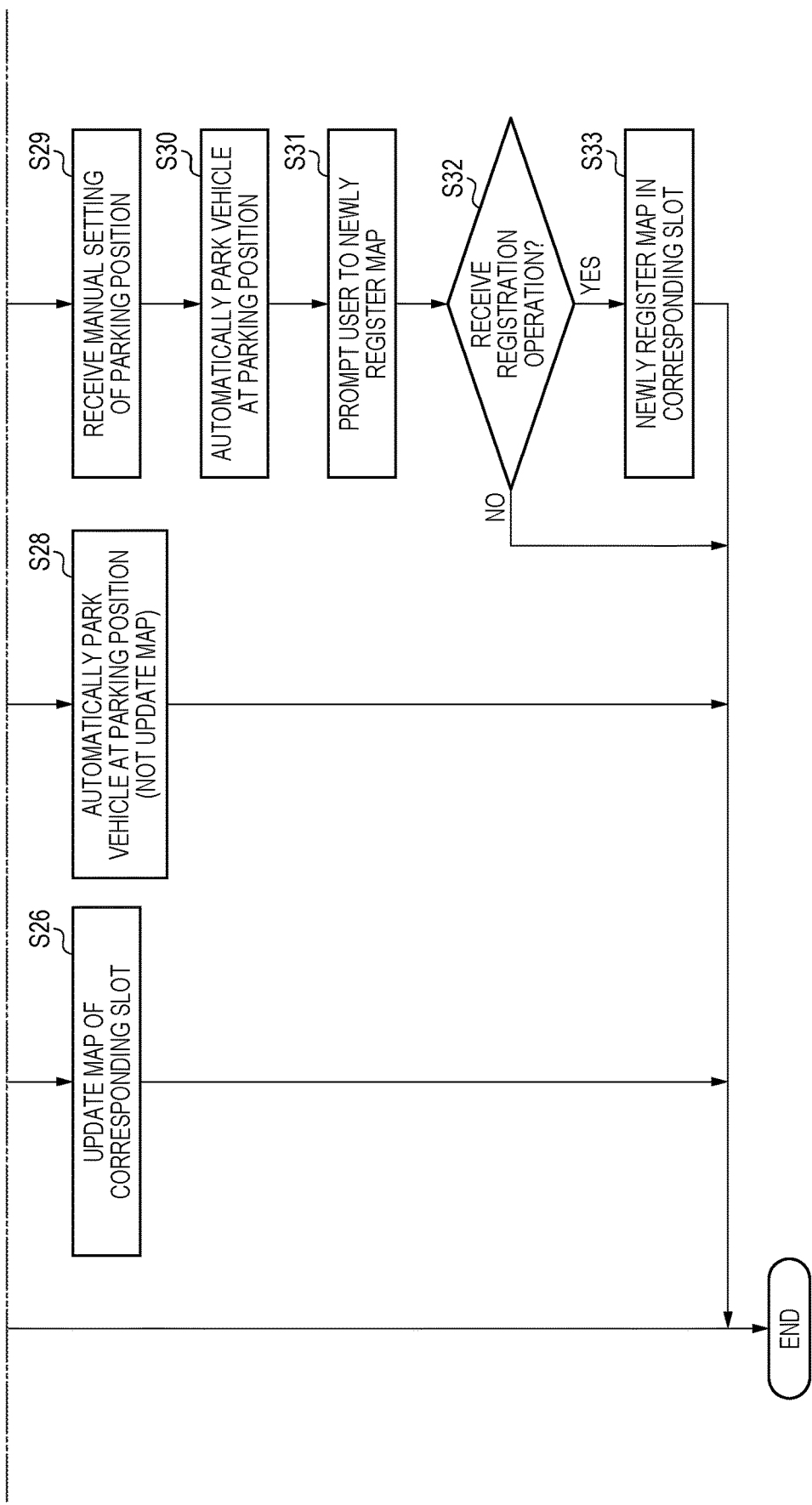

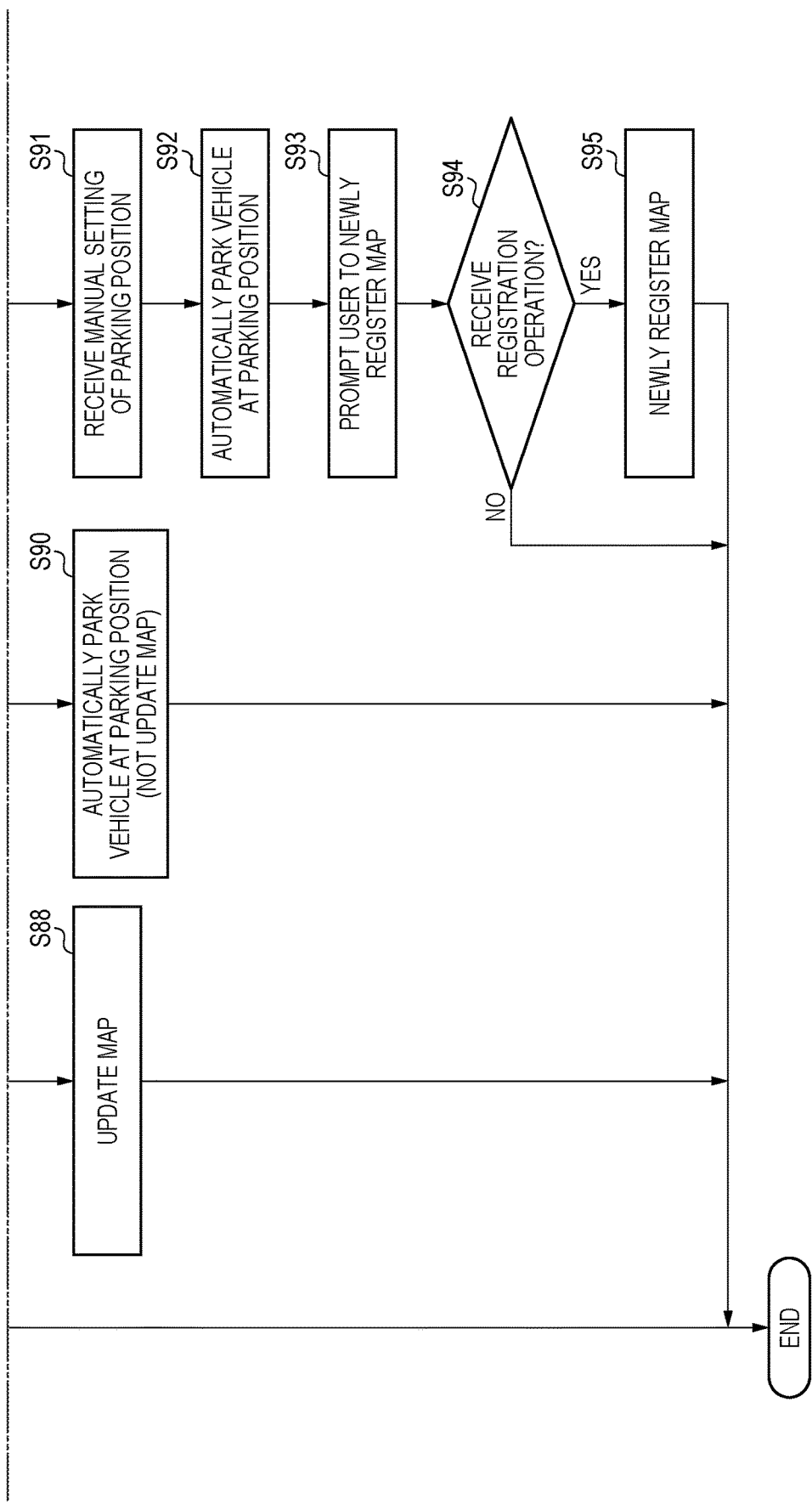

MOVING BODY CONTROL DEVICE, MOVING BODY CONTROL METHOD, AND MOVING BODY STORAGE MEDIUM

CROSS-REFERENCE RELATED ARTS

This application is based on and claims priority under 35 USC 119 from Japanese Patent Application No. 2022-172983 filed on Oct. 28, 2022, the entire contents of which are incorporated herein by reference.

TECHNICAL FIELD

The present disclosure relates to a moving body control device, a moving body control method, and a storage medium storing a moving body control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to automatic driving technique.

In the related art, automatic parking control of automatically moving and parking a vehicle in a designated predetermined parking space has been known. JP2020-117128A discloses a parking assistance device with which a user drives a vehicle by himself/herself and performs manual driving parking of parking the vehicle in a predetermined parking space, in which information on features around the vehicle is acquired and stored in a memory during the manual driving parking, and by which automatic parking control is performed based on the feature information, which contributes to development of a sustainable transportation system accordingly.

SUMMARY

Incidentally, even when the vehicle is parked in the same parking space, there may be a difference in the acquired information on the features around the vehicle due to, for example, seasonal changes, elapse of time, a weather change, or a time period. Therefore, in a case where the feature information at a time of being stored in the memory and the feature information at a time of the next automatic parking execution unmatch, the target parking space cannot be recognized based on the feature information, and the automatic parking control cannot be performed. JP2020-117128A does not disclose vehicle control when the change occurs in the feature information due to the seasonal changes, the elapse of time, the weather change, or the time period. Therefore, there is room for improvement in the related art in this regard.

An object of the present disclosure is to provide a moving body control device, a moving body control method, and a storage medium storing a moving body control program that may perform an automatic parking of a vehicle at a designated parking position continuously even when features of an external environment of a moving body change.

According to an aspect of the present disclosure, there is provided a moving body control device including:
an external environment recognition unit configured to acquire recognition data of an external environment of a moving body;
a reception unit configured to receive designation of a predetermined parking position from a user of the moving body; and
a control unit configured to perform automatic parking control for parking the moving body at the predetermined parking position based on the recognition data of the external environment and the predetermined parking position, and to register the predetermined parking position as a designated parking position,
wherein the control unit registers a feature related to the designated parking position based on the recognition data of the external environment as a registered feature, and performs the automatic parking control for parking the moving body at the designated parking position based on the recognition data of the external environment and the registered feature, and
the control unit updates the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to another aspect of the present disclosure, there is provided a moving body control method including:
by a processor of a moving body control device,
acquiring recognition data of an external environment of a moving body;
receiving designation of a predetermined parking position from a user of the moving body;
performing automatic parking control for parking the moving body at the predetermined parking position based on the recognition data of the external environment and the predetermined parking position, and registering the predetermined parking position as a designated parking position;
registering a feature related to the designated parking position based on the recognition data of the external environment as a registered feature, and performing the automatic parking control for parking the moving body at the designated parking position based on the recognition data of the external environment and the registered feature; and
updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to another aspect of the present disclosure, there is provided a non-transitory computer readable storage medium storing a moving body control program causing a processor of a moving body control device to execute processing, the processing including:
acquiring recognition data of an external environment of a moving body;
receiving designation of a predetermined parking position from a user of the moving body;
performing automatic parking control for parking the moving body at the predetermined parking position based on the recognition data of the external environment and the predetermined parking position, and registering the predetermined parking position as a designated parking position;

registering a feature related to the designated parking position based on the recognition data of the external environment as a registered feature, and performing the automatic parking control for parking the moving body at the designated parking position based on the recognition data of the external environment and the registered feature; and updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to a moving body control device, a moving body control method, and a storage medium storing a moving body control program of the present disclosure, it is possible to continuously automatically park a vehicle at a designated parking position even when features of an external environment of a moving body change.

BRIEF DESCRIPTION OF DRAWINGS

FIG. 11 is a flowchart showing an example of automatic parking control for parking the vehicle at a registered parking position;

DESCRIPTION OF EMBODIMENTS

Figure 1:
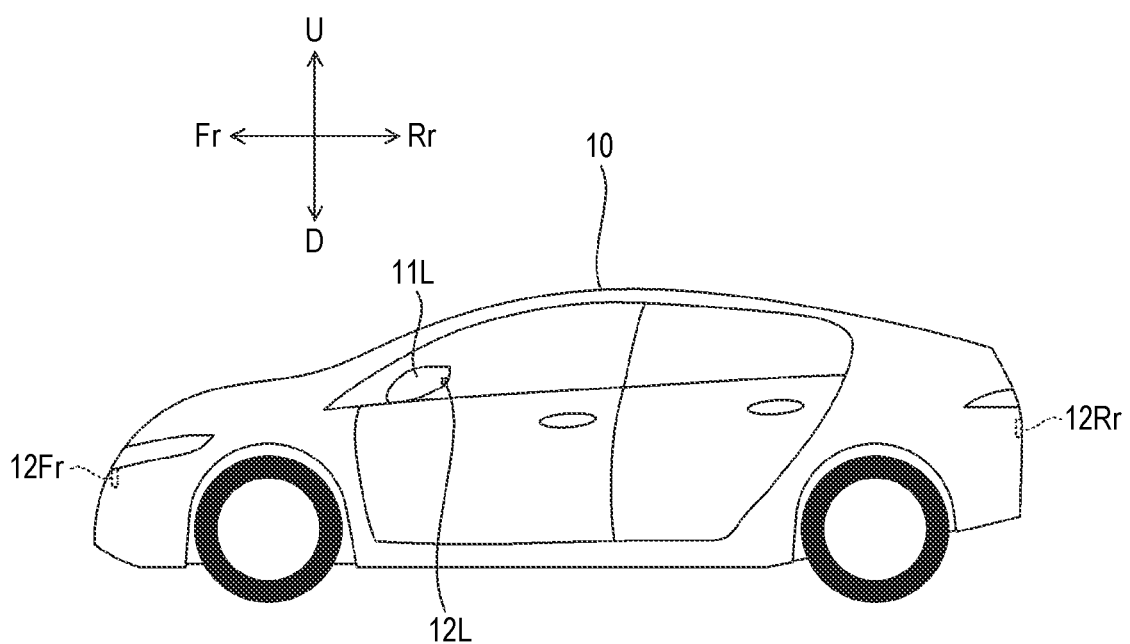
FIG. 1 is a side view showing an example of a vehicle on which a moving body control device according to the present embodiment is mounted.

Hereinafter, an embodiment of a moving body control device, a moving body control method, and a moving body control program of the present disclosure will be described with reference to the accompanying drawings. The drawings are to be viewed in directions of reference numerals. Further, in the present specification and the like, in order to simplify and clarify description, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

(Vehicle 10 on which Moving Body Control Device is Mounted)

Figure 2:
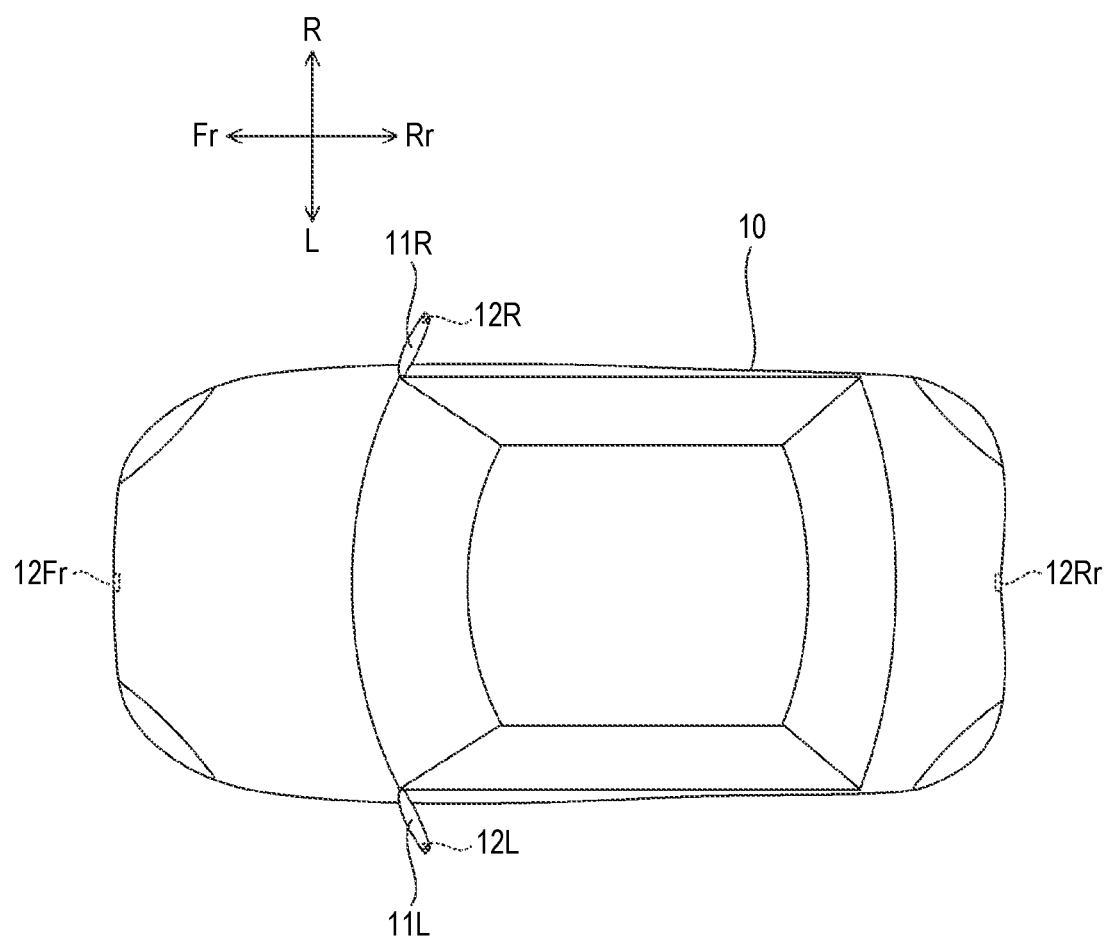
FIG. 2 is a top view of the vehicle shown in FIG. 1.

FIG. 1 is a side view of the vehicle 10 on which the moving body control device of the present disclosure is mounted. FIG. 2 is a top view of the vehicle 10 shown in FIG. 1. The vehicle 10 is an example of a moving body of the present disclosure.

The vehicle 10 is an automobile including a drive source (not shown), and wheels including drive wheels driven by power of the drive source and steerable driven wheels. In the present embodiment, the vehicle 10 is a four-wheel automobile including a pair of left and right front wheels and rear wheels. The drive source of the vehicle 10 is, for example, an electric motor. The drive source of the vehicle 10 may be an internal combustion engine such as a gasoline engine or a diesel engine, or a combination of the electric motor and the internal combustion engine. Further, the drive source of the vehicle 10 may drive the pair of left and right front wheels, the pair of left and right rear wheels, or the four wheels including the pair of left and right front wheels and rear wheels. Both the front wheels and the rear wheels may be the steerable driven wheels, or either one of the front wheels and the rear wheels may be the steerable driven wheels.

The vehicle 10 further includes side mirrors 11L and 11R. The side mirrors 11L and 11R are mirrors (rear-view mirrors) that are provided on outer sides of front seat doors of the vehicle 10 and that are for the driver to confirm a rear side and rear left and right sides. Each of the side mirrors 11L and 11R is fixed to a main body of the vehicle 10 by a rotation shaft that extends in a perpendicular direction, and may be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided on a front side of the vehicle 10 and that images the front side of the vehicle 10. The rear camera 12Rr is a digital camera that is provided on a rear side of the vehicle 10 and that images the rear side of the vehicle 10. The left side camera 12L is a digital camera that is provided on the left side mirror 11L of the vehicle 10 and that images a left side of the vehicle 10. The right side camera 12R is a digital camera that is provided on the right side mirror 11R of the vehicle 10 and that images a right side of the vehicle 10. The front camera 12Fr, the rear camera 12Rr, the left side camera 12L, and the right side camera 12R are examples of an external environment recognition unit of the present disclosure.

(Internal Configuration of Vehicle 10)

Figure 3:
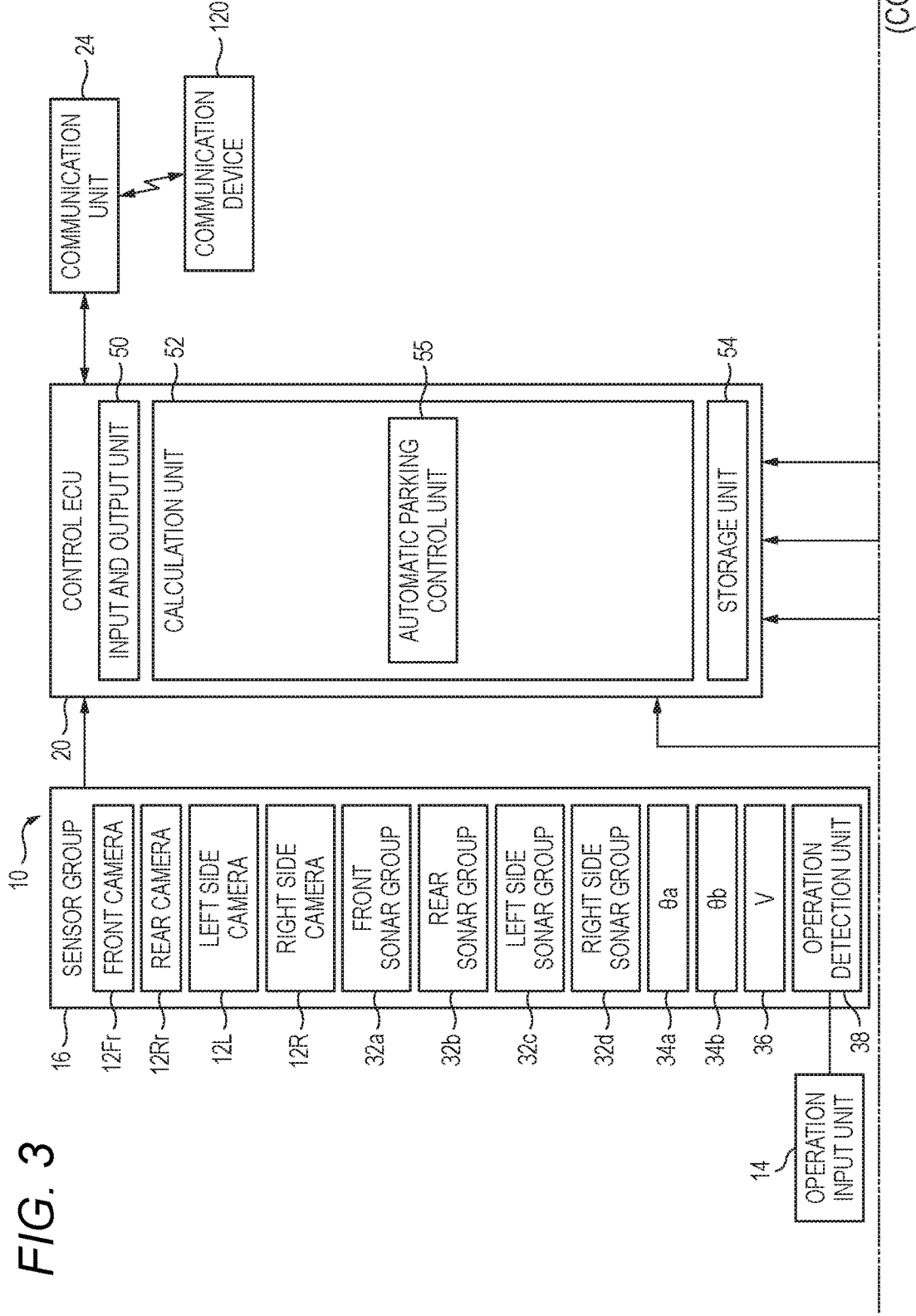
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. The sensor group 16, the navigation device 18, and the control ECU 20 constitute examples of the moving body control device of the present disclosure.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38.

The front camera 12Fr, the rear camera 12Rr, the left side camera 12L, and the right side camera 12R acquire recognition data (for example, the surrounding image) for recognizing the external environment of the vehicle 10 by imaging surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image including the left side image and the right side image may be referred to as a side image.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are respectively provided on an obliquely left front side, a front left side, a front right side, and an obliquely right front side of the vehicle 10. The rear sonar group 32b includes, for example, four sonars. The sonars that constitute the rear sonar group 32b are respectively provided on an obliquely left rear side, a rear left side, a rear right side, and an obliquely right rear side of the vehicle 10. The left side sonar group 32c includes, for example, two sonars. The sonars that constitute the left side sonar group 32c are respectively provided at a left side front portion and a left side rear portion of the vehicle 10. The right side sonar group 32d includes, for example, two sonars. The sonars that constitute the right side sonar group 32d are respectively provided at a right side front portion and a right side rear portion of the vehicle 10.

The wheel sensors 34a and 34b detect rotation angles of the wheels of the vehicle 10. The wheel sensors 34a and 34b may include angle sensors, or may include displacement sensors. The wheel sensors 34a and 34b output detection pulses each time the wheels rotate at a predetermined angle. The detection pulses output from the wheel sensors 34a and 34b are used for calculating the rotation angles of the wheels and rotation speeds of the wheels. A movement distance of the vehicle 10 is calculated based on the rotation angles of the wheels. The wheel sensor 34a detects, for example, a rotation angle θa of the left rear wheel. The wheel sensor 34b detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content of a user performed using the operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various kinds of guidance information to a passenger of the vehicle 10 by a sound.

The touch panel 42 is configured to input various commands to the control ECU 20. For example, the user may input a command related to parking assistance of the vehicle 10 via the touch panel 42. Further, the touch panel 42 is configured to display various screens related to control content of the control ECU 20. For example, a screen related to the parking assistance of the vehicle 10 is displayed on the touch panel 42. Specifically, a parking assistance button for requesting the parking assistance of the vehicle 10 is displayed on the touch panel 42. The parking assistance button includes an automatic parking button for requesting parking by automatic steering of the control ECU 20, and a parking support button for requesting support during parking by an operation of the driver. Components other than the touch panel 42, for example, a smartphone, may be used as an input device or a display device. The touch panel 42 (navigation device 18) and the smartphone are examples of a reception unit of the present disclosure.

The "parking" is, for example, a stop as an occupant gets on or off the vehicle, and excludes a temporary stop due to a traffic signal or the like. Further, a "parking position" is a position where the moving body is stopped.

The control ECU 20 includes an input and output unit 50, a calculation unit 52, and a storage unit 54. The calculation unit 52 includes, for example, a central processing unit (CPU). The calculation unit 52 performs various kinds of control by controlling the units based on a program stored in the storage unit 54. Further, the calculation unit 52 inputs and outputs a signal from and to each unit connected to the control ECU 20 via the input and output unit 50.

The calculation unit 52 includes an automatic parking control unit 55 for controlling the automatic parking of the vehicle 10. The automatic parking control unit 55 is an example of a control unit of the present disclosure. The automatic parking control unit 55 performs the parking assistance of the vehicle 10 by automatic steering of automatically performing an operation of a steering wheel 110 under control of the automatic parking control unit 55. In assistance of the automatic steering, operations of an accelerator pedal (not shown), a brake pedal (not shown), and the operation input unit 14 are automatically performed. Further, the automatic parking control unit 55 performs support assistance when the driver manually parks the vehicle 10 by operating the accelerator pedal, the brake pedal, and the operation input unit 14.

For example, the automatic parking control unit 55 controls automatic parking of parking the vehicle 10 at a designated predetermined parking position based on recognition data of an external environment of the vehicle 10 acquired by the front camera 12Fr, the rear camera 12Rr, the left side camera 12L, and the right side camera 12R and a predetermined parking position designated by the user.

The automatic parking control unit 55 registers the predetermined parking position designated by the user as a designated parking position in the storage unit 54. The automatic parking control unit 55 registers features related to the designated parking position as registered features in the storage unit 54 based on the recognition data of the external environment of the vehicle 10 acquired by the front camera 12Fr, the rear camera 12Rr, the left side camera 12L, and the right side camera 12R. The automatic parking control unit 55 controls the automatic parking of parking the vehicle 10 at the designated parking position based on the recognition data of the external environment of the vehicle 10 and the registered features of the designated parking position designated by the user.

The features related to the designated parking position include features of the designated parking position itself, features around the designated parking position, and the like. Examples of the features of the designated parking position itself include features relating to a feature in which characters such as "parking" are indicated in the designated parking position. Examples of the features around the designated parking position relate to featured buildings, obstacles, and the like present around the designated parking position.

The automatic parking control unit 55 detects a matching rate between features obtained based on the recognition data of the external environment during execution of the automatic parking and registered features acquired before the execution and already registered, and updates the registered features according to the matching rate. When the matching rate between the features obtained during the execution of the automatic parking and the registered features is equal to or larger than a first threshold (for example, 80%), the automatic parking control unit 55 does not update the registered features. When the matching rate between the features obtained during the execution of the automatic parking and the registered features is less than the first threshold and equal to or larger than a second threshold (for example, 60%) that is lower than the first threshold, the automatic parking control unit 55 updates the registered features. When the matching rate between the features obtained during the execution of the automatic parking and the registered features is less than the second threshold and equal to or larger than a third threshold (for example, 30%) that is lower than the second threshold, the automatic parking control unit 55 does not update the registered features. When the matching rate between the features obtained during the execution of the automatic parking and the registered features is less than the third threshold, the automatic parking control unit 55 performs new registration of the features as a registered feature. However, whether to perform new registration of the features as the registered feature is selected by the user of the vehicle 10. When the matching rate between the features during the execution of the automatic parking and the registered features is equal to or larger than the second threshold, the automatic parking control unit 55 executes the automatic parking of the vehicle 10 based on the registered features. When the matching rate between the features during the execution of the automatic parking and the registered features is less than the second threshold, the automatic parking control unit 55 does not execute the automatic parking of the vehicle 10 based on the registered features. Each numerical value (%) indicating the threshold of the matching rate is merely an example of a numerical value as a standard.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 coupled to the steering wheel 110, thereby enabling the occupant to perform operation assistance of the steering wheel 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 may perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

(Automatic Parking Control Performed by Automatic Parking Control Unit 55)

Next, the automatic parking control of the vehicle 10 performed by the automatic parking control unit 55 will be described with reference to FIGS. 4 to 13.

Figure 4:
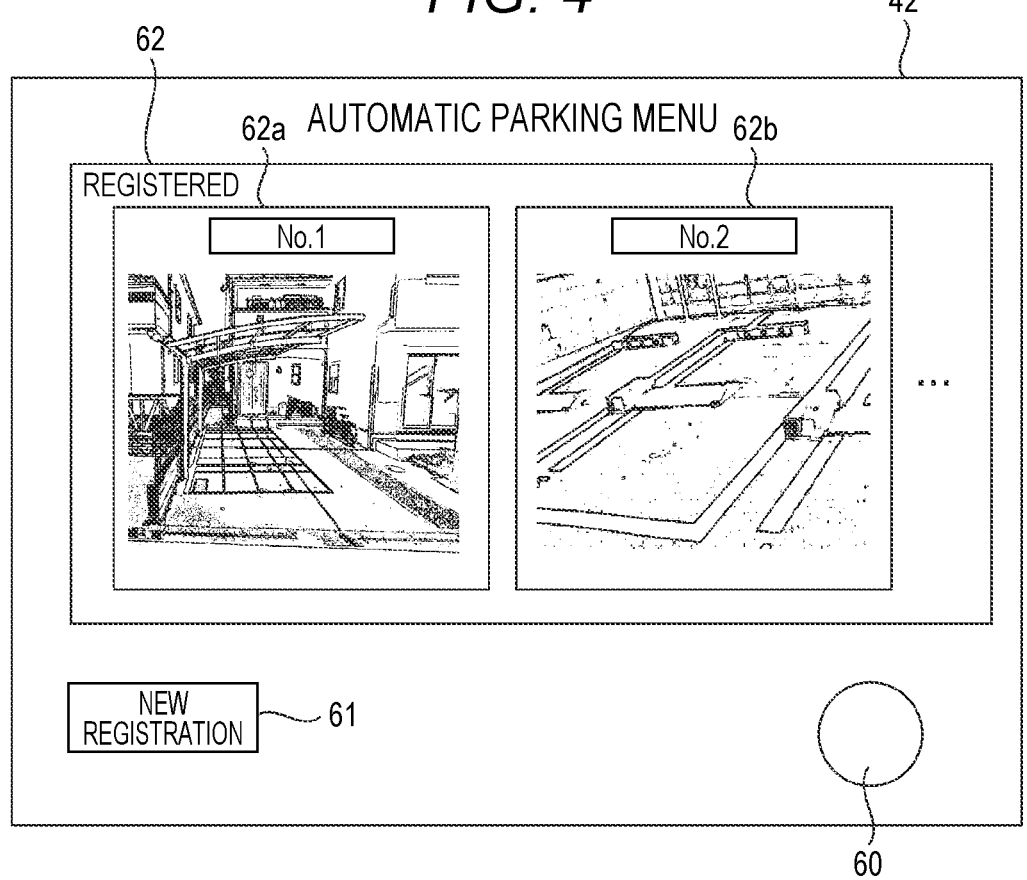
FIG. 4 is a diagram showing an example of an image displayed on a navigation device when automatically parking the vehicle.

FIG. 4 is a diagram showing an example of an "automatic parking menu" displayed on the touch panel 42 of the navigation device 18 when automatically parking the vehicle 10. An image of the automatic parking menu is displayed by touching an automatic parking button 60 displayed on the touch panel 42. The automatic parking button 60 is touched to display the automatic parking menu when, for example, the user who wants to park the vehicle 10 comes to a vicinity of a parking lot.

As shown in FIG. 4, a new registration button 61 and a registered parking position image button 62 are displayed in the image of the automatic parking menu. The new registration button 61 is a button operated when the vehicle 10 is to be parked at a parking position newly registered as the designated parking position. The registered parking position image button 62 is a button operated when the vehicle 10 is to be parked at the designated parking position that has been already registered. Examples of the registered parking position image button 62 include a parking position image button on which a parking space at home is registered as the designated parking position as shown in a No. 1 image button 62a, and a parking position image button on which a coin-operated parking space having a high parking frequency is registered as the designated parking position as shown in a No. 2 image button 62b. The image displayed on the registered parking position image button 62 is an image captured by, for example, the front camera 12Fr of the vehicle 10 during registration.

(Automatic Parking Control to New Parking Position)

Figure 5:
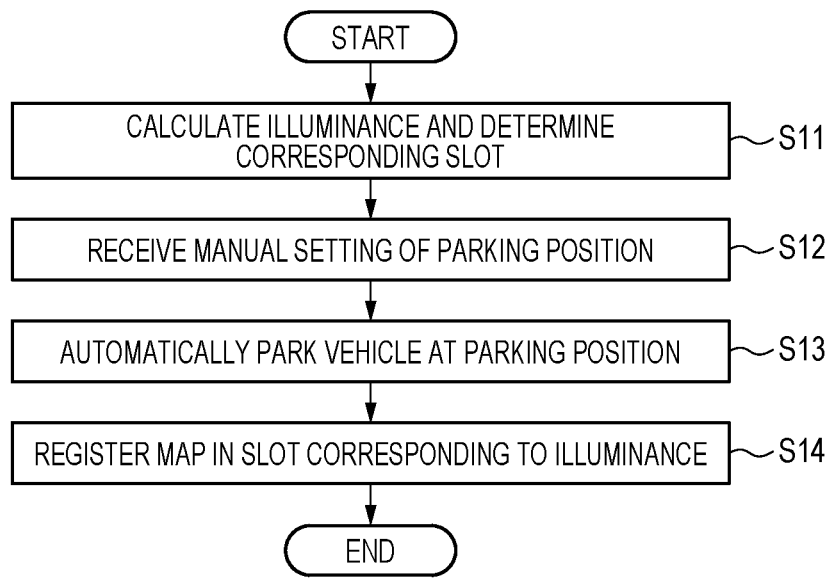
FIG. 5 is a flowchart showing automatic parking control for parking the vehicle at a new parking position.
Figure 6:
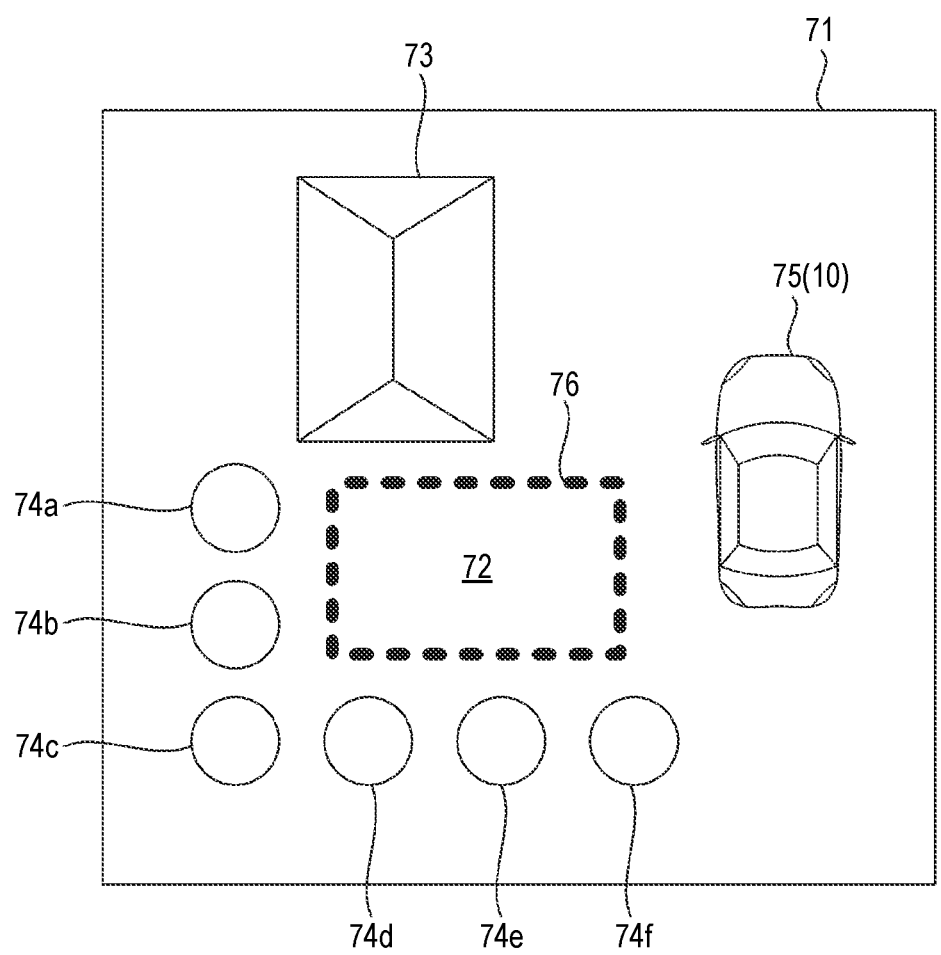
FIG. 6 is a diagram in which a parking position is set in a top view image generated based on a captured image of a camera.
Figures 7, 8:
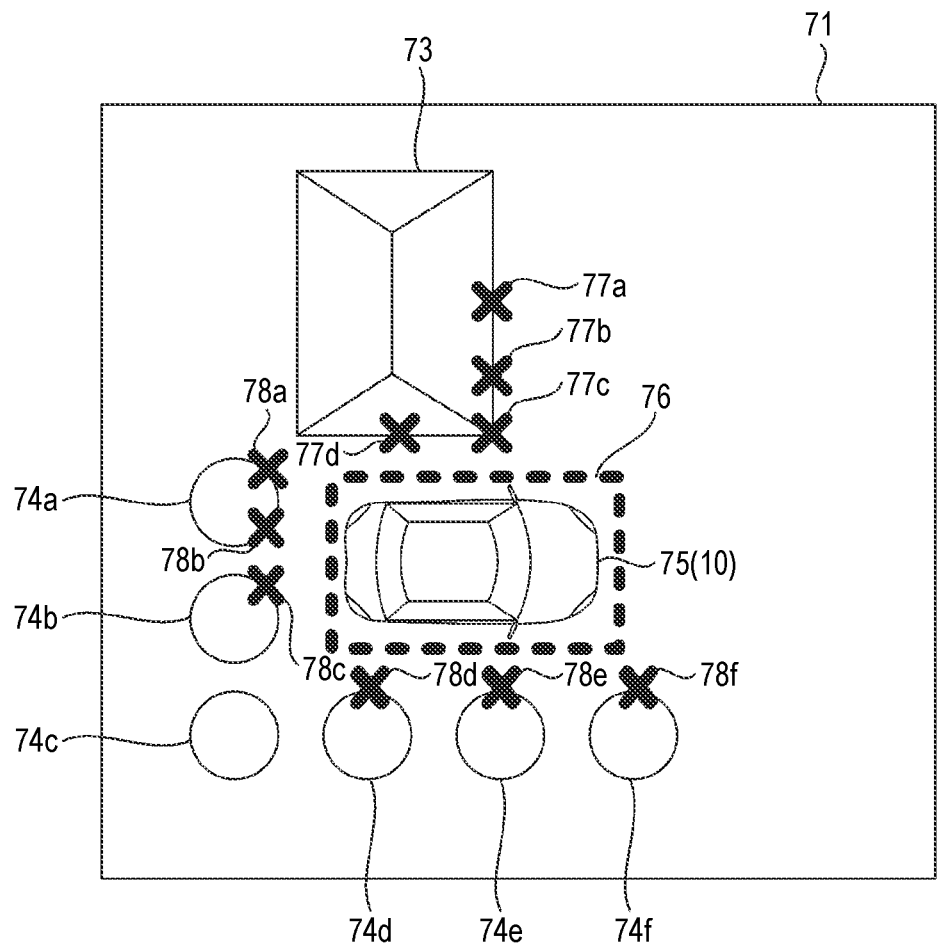
FIG. 7 is a diagram showing features around the parking position shown in FIG. 6.
FIG. 8 is a table showing an example of registered content registered for the parking position.
Figure 9:
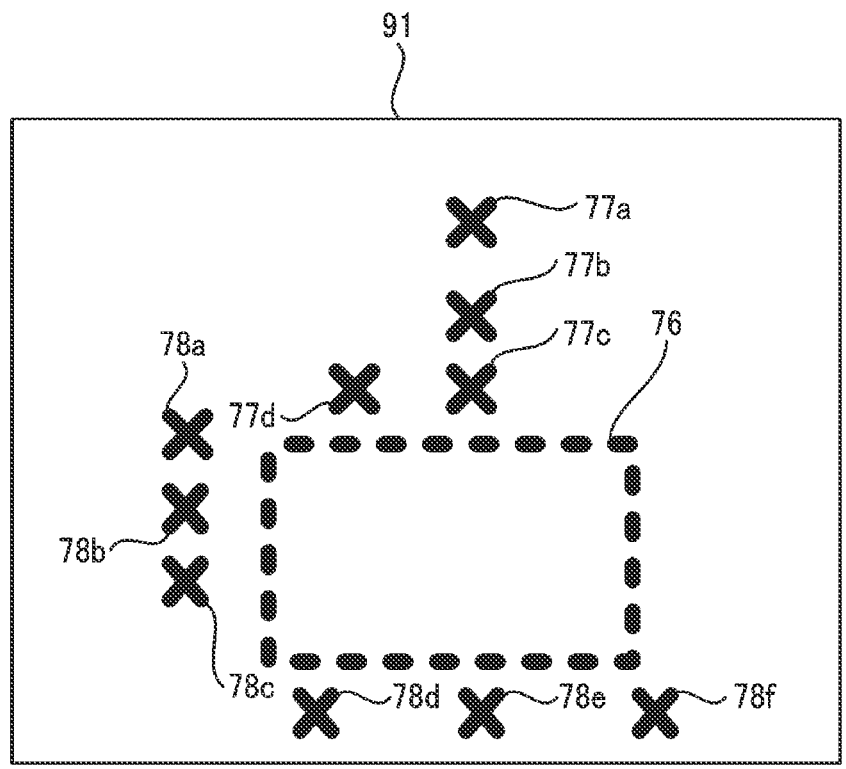
FIG. 9 is a diagram showing an example of a map included in the registered content in FIG. 8.

First, automatic parking control performed by the automatic parking control unit 55 when the new registration button 61 is touched will be described with reference to FIGS. 5 to 9. FIG. 5 is a flowchart showing the automatic parking control for parking the vehicle 10 at a new parking position. FIG. 6 is a diagram obtained by setting a parking position 76 in a top view image 71 (combined image) generated by the recognition data of the external environment of the vehicle 10 acquired by the front camera 12Fr, the rear camera 12Rr, the left side camera 12L, and the right side camera 12R. FIG. 7 is a diagram showing features around the parking position 76 shown in FIG. 6. FIG. 8 is a table showing an example of registered content registered for the parking position. FIG. 9 is a diagram showing an example of a map included in the registered content in FIG. 8. When the new registration button 61 is touched, the automatic parking control unit 55 starts the processing shown in FIG. 5.

First, the automatic parking control unit 55 calculates an illuminance of the external environment based on the recognition data of the external environment of the vehicle 10 acquired by the front camera 12Fr, the rear camera 12Rr, the left side camera 12L, and the right side camera 12R, and determines which slot among a plurality of preset slots the calculated illuminance corresponds to (step S11). The plurality of slots are classified and set by, for example, a level of brightness of a surrounding environment such as "daytime" during which the illuminance is high and "nighttime" during which the illuminance is low.

For example, as in the top view image 71 shown in FIG. 6, the vehicle 10 is stopped in front of the parking lot 72 at home. When the new registration button 61 is touched in order to register a newly designated parking position, the recognition data of the external environment is acquired by the front camera 12Fr, the rear camera 12Rr, the left side camera 12L, and the right side camera 12R, and the illuminance of the external environment is calculated. In the top view image 71, a house (building) 73 of the driver, and a plurality of plantings (obstacles) 74a to 74f are included by imaging. The parking lot 72 is designated between the building 73 and the obstacles 74a to 74f. The vehicle displayed in the top view image 71 is an image showing a state where the vehicle 10 is viewed from above, and is a vehicle image 75 generated (imaged) in advance and stored in the storage unit 54 or the like.

Next, the automatic parking control unit 55 receives manual setting by the driver for setting the parking position of the vehicle 10 (step S12).

As shown in FIG. 6, the manual setting of the parking position is performed by touching the rectangular parking position 76 showing a region where the vehicle 10 is parked on the touch panel 42, and sliding the vehicle 10 to a target parking position where the vehicle 10 is desired to be parked.

When receiving the manual setting of the parking position 76 in step S12, the automatic parking control unit 55 detects the features related to the designated parking position 76 from the recognition data of the external environment acquired by the front camera 12Fr, the rear camera 12Rr, the left side camera 12L, and the right side camera 12R, and automatically parks the vehicle 10 at the parking position 76 based on the detected features (step S13).

For example, as in the top view image 71 shown in FIG. 7, the automatic parking control unit 55 detects building features 77a to 77d showing a position of a contour of the building 73 on a side close to the parking position 76, obstacle features 78a to 78f showing positions of the obstacles 74a to 74f present around the parking position 76, and the like as the features related to the designated parking position 76.

Next, the automatic parking control unit 55 registers, in the storage unit 54, a map including the features related to the designated parking position 76 detected in step S13 and the parking position 76 set in step S12 in association with a slot corresponding to the illuminance determined in step S11 (step S14). Further, at this time, the automatic parking control unit 55 also registers the illuminance calculated in step S11 in the storage unit 54 in association with the map and the slot.

For example, as shown in a correspondence table 81 in FIG. 8, the content registered for the designated parking position 76 is classified into a plurality of patterns such as the "daytime" during which the illuminance is high and the "nighttime" during which the illuminance is low as the slots corresponding to the illuminances. Further, the map including the parking position 76 and the features related to the parking position 76 is registered like, for example, a "map a" and a "map b" in correspondence with the slots of the "daytime" and the "nighttime", respectively.

Specifically, as in a map 91 shown in FIG. 9, the map including the parking position 76 and the features related to the parking position 76 is registered as a map showing a relationship between the building features 77a to 77d and the obstacle features 78a to 78f detected in the top view image 71 in FIG. 7 and the manually set parking position 76. For convenience of description, the "map a" is registered corresponding to the "daytime", and the "map b" is registered corresponding to the "nighttime" in the correspondence table 81 in FIG. 8, but since the present example is processing when the new registration button 61 is touched, the map actually registered in step S14 is only a map of a slot corresponding to an illuminance during registration.

Accordingly, the parking position 76 designated by the user is registered in the storage unit 54 as the designated parking position including features corresponding to an illuminance of the external environment, and is displayed in the automatic parking menu as one of the registered parking position image buttons 62.

(Automatic Parking Control on Registered Parking Position)

Next, automatic parking control performed by the automatic parking control unit 55 when the registered parking position image button 62 is touched will be described with reference to FIGS. 10 to 13.

Figure 10:
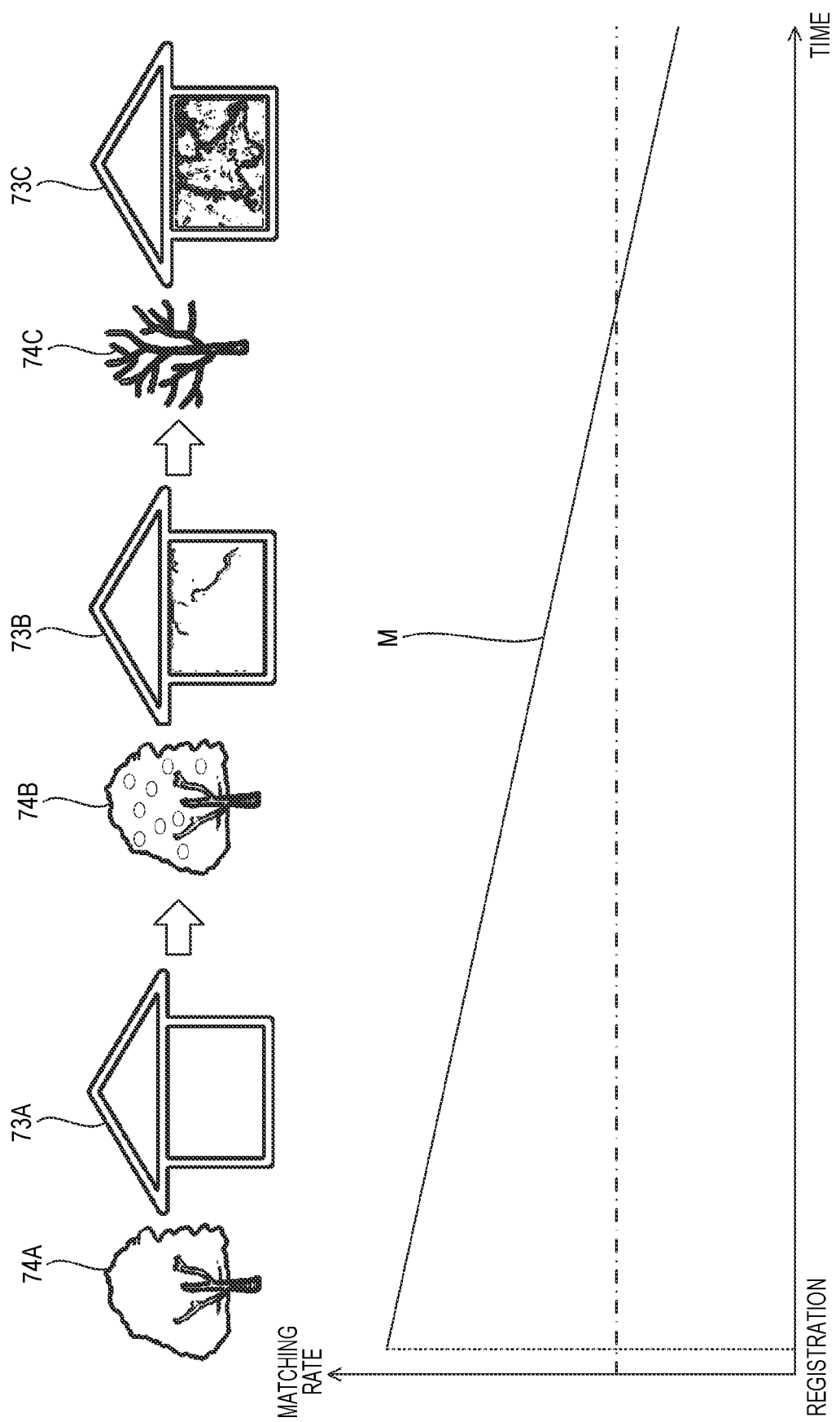
FIG. 10 is a diagram showing appearances of objects and a matching rate of features of the objects, which change as time elapses.

FIG. 10 is a diagram showing appearances of objects around the parking position and a matching rate of features of the objects, which change as time elapses. As shown in FIG. 10, the building 73 (73A to 73C) and the obstacle 74 (74A to 74C) present in the external environment where the vehicle 10 is parked have appearances changed due to aging deterioration and seasonal changes. When the appearances of the building 73 (73A to 73C) and the obstacle 74 (74A to 74C) change, the recognition data of the external environment acquired by the front camera 12Fr, the rear camera 12Rr, the left side camera 12L, and the right side camera 12R of the vehicle 10 also changes.

Therefore, even when features are detected from recognition data of, for example, the building 73A and the planting (obstacle) 74A and are registered, when the appearances change like the building 73B and the planting (obstacle) 74B, and further the building 73C and the planting (obstacle) 74C due to temporal elapse or the seasonal changes, the features detected from the recognition data also change, and a matching rate M of the features gradually decreases. Therefore, in a case where the vehicle 10 is parked at the designated parking position, when the features around the designated parking position detected from the recognition data change due to the temporal elapse or the seasonal changes, the automatic parking of the vehicle 10 to the designated parking position based on the registered features may not be correctly performed.

Therefore, in the automatic parking control performed by the automatic parking control unit 55 in the present example, when the vehicle 10 is automatically parked at the designated parking position for which the features of the parking position are registered, the registered features are updated according to the matching rate between the features related to the designated parking position acquired during execution of the automatic parking and the registered features.

Further, in the automatic parking control performed by the automatic parking control unit 55 in the present example, the registered features are updated according to the matching rate between the illuminance of the external environment acquired during the execution of the automatic parking and the illuminance corresponding to the registered features. Accordingly, for example, a situation where the registered features corresponding to the "daytime" is overwritten by the features obtained during the nighttime may be prevented, and an illuminance may be appropriately updated according to an illuminance of the external environment.

Figure 12:
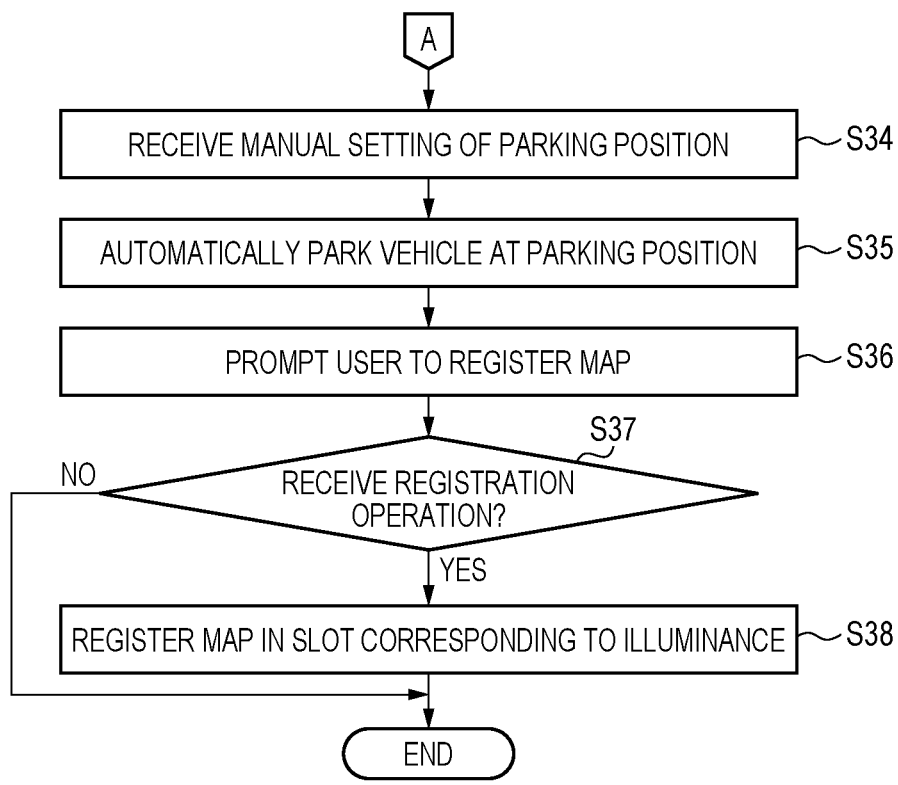
FIG. 12 is a flowchart showing an example of control when a map is not registered in a corresponding slot in the control in FIG. 11.
Figure 13:
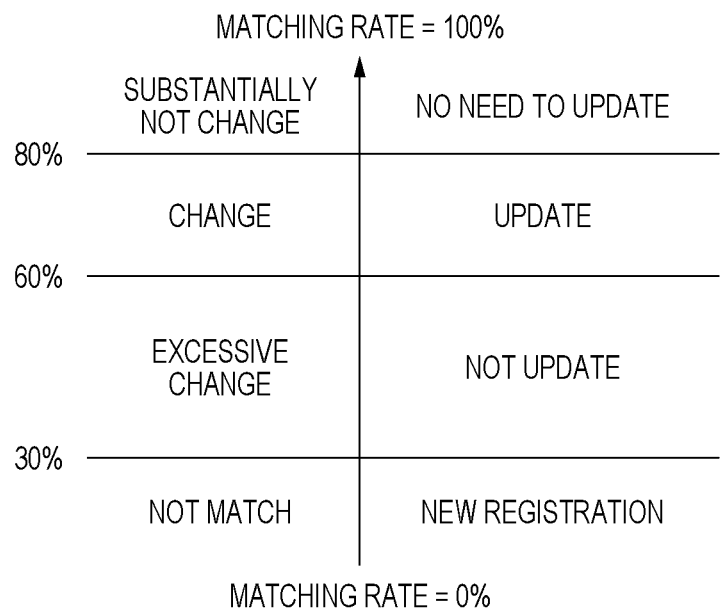
FIG. 13 is a diagram showing a relationship between a matching rate of features of an external environment and update.

FIG. 11 is a flowchart showing an example of automatic parking control for parking the vehicle 10 at a registered parking position. FIG. 12 is a flowchart showing an example of control when a map is not registered in a corresponding slot in the control in FIG. 11. FIG. 13 is a diagram showing a relationship between the matching rate of the features and the update of the registered features.

When the registered parking position image button 62 of the automatic parking menu shown in FIG. 4 is touched, the automatic parking control unit 55 starts processing in FIG. 11. In the present example, it is assumed that the No. 1 image button 62a is touched by the driver of the vehicle 10.

The automatic parking control unit 55 calculates an illuminance of the external environment from the recognition data of the external environment of the vehicle 10 acquired by the front camera 12Fr, the rear camera 12Rr, the left side camera 12L, and the right side camera 12R (step S19).

Next, the automatic parking control unit 55 determines whether a map is registered in a slot corresponding to the illuminance of the external environment determined in step S19 for a designated parking position of the No. 1 image button 62a (step S20). Specifically, the automatic parking control unit 55 determines whether there is a slot associated with an illuminance within a predetermined range (for example, a difference is within a predetermined value) with respect to the illuminance calculated in step S19 among slots for which the features are registered (for example, the "daytime" and the "nighttime").

When the map is registered in the corresponding slot in step S20 (step S20: Yes), the automatic parking control unit 55 acquires features of the map registered in the slot corresponding to the illuminance of the external environment determined in step S19 as the registered features. Further, the automatic parking control unit 55 acquires features related to a current designated parking position (hereinafter, referred to as features-during-execution) by the front camera 12Fr, the rear camera 12Rr, the left side camera 12L, and the right side camera 12R. The automatic parking control unit 55 calculates a matching rate between the acquired features-during-execution and the acquired registered features (step S21). Next, the automatic parking control unit 55 determines whether the matching rate between the features-during-execution and the registered features is equal to or larger than 80% (step S22).

When the matching rate is equal to or larger than 80% in step S22 (step S22: Yes), the automatic parking control unit 55 automatically parks the vehicle 10 at the designated parking position designated by the driver based on the feature map representing the registered features (for example, the feature map 91 shown in FIG. 9) (step S23). When the matching rate between the features during execution and the registered features is equal to or larger than 80%, as shown in FIG. 13, it is determined that the features of the external environment of the designated parking position substantially do not change, the feature map representing the registered features registered so far in the storage unit 54 is maintained as it is, and the feature map is not updated.

When the matching rate is not equal to or larger than 80% in step S22 (step S22: No), the automatic parking control unit 55 determines whether the matching rate is equal to or larger than 60% (step S24). When the matching rate is equal to or larger than 60% in step S24 (step S24: Yes), the automatic parking control unit 55 automatically parks the vehicle 10 at the designated parking position based on the feature map representing the features-during-execution acquired in step S21 (step S25).

Next, the automatic parking control unit 55 updates the feature map of the corresponding slot determined in step S20, which is the feature map representing the registered features registered so far for the designated parking position designated by the driver, with the feature map representing the features-during-execution (step S26). Further, at this time, the automatic parking control unit 55 also registers the feature map in association with the illuminance calculated in step S19 in the storage unit 54. That is, when the matching rate between the features-during-execution and the registered features is equal to or larger than 60% and less than 80%, as shown in FIG. 13, the automatic parking control unit 55 determines that the features of the external environment of the designated parking position change, and updates the feature map registered in the storage unit 54 to a current feature map. In this case, the entire feature map may be updated, or only features different in the feature map may be updated.

When the matching rate is not equal to or larger than 60% in step S24 (step S24: No), the automatic parking control unit 55 determines whether the matching rate is equal to or larger than 30% (step S27). When the matching rate is equal to or larger than 30% in step S27 (step S27: Yes), the automatic parking control unit 55 automatically parks the vehicle 10 at the parking position 76 based on the feature map representing the features-during-execution acquired in step S21 (step S28).

When the matching rate between the features-during-execution and the registered features is equal to or larger than 30% and less than 60%, as shown in FIG. 13, it is determined that the features of the external environment of the designated parking position extremely change, the feature map representing the registered features registered so far in the storage unit 54 is maintained as it is, and the feature map is not updated. It is assumed that the case where the matching rate is equal to or larger than 30% and less than 60% is, for example, a case where the features temporarily largely change due to heavy rain or snow. In this case, after a short period elapses (after a few days), it is considered that the matching rate between the features-during-execution and the registered features returns to being equal to or larger than 60%. Therefore, it is determined that the feature map representing the registered features is to be maintained.

When the matching rate is not equal to or larger than 30% in step S27 (step S27: No), the automatic parking control unit 55 receives the manual setting performed by the driver for setting the parking position of the vehicle 10 (step S29). A notification of receiving the manual setting and a method for the manual setting are similar to the notification and the method in step S28.

When receiving the setting of the parking position 76 (see FIG. 6) in step S29, the automatic parking control unit 55 acquires the features-during-execution, and automatically parks the vehicle 10 at the parking position 76 based on the acquired features-during-execution (step S30).

Next, the automatic parking control unit 55 prompts the driver to newly register a feature map representing the features-during-execution acquired in step S29 as a feature map of a newly designated parking position (step S31). For example, the automatic parking control unit 55 displays the top view image as shown in FIG. 7 on the touch panel 42, and displays "a parking success rate may increase by registering a parking place. Do you perform registration?" and the like. At that time, a "registration button" to be touched in a case of registration and a "non-registration button" to be touched in a case of no registration may be displayed.

Next, the automatic parking control unit 55 determines whether an operation of newly registering the feature map is received from the driver (step S32). When receiving the operation of newly registering the map in step S32 (step S32: Yes), the automatic parking control unit 55 newly registers the feature map representing the features-during-execution acquired in step S30 as the feature map of the newly designated parking position in the corresponding slot determined in step S20 (step S33).

That is, when the matching rate between the features-during-execution and the registered features is less than 30%, as shown in FIG. 13, the automatic parking control unit 55 determines that they do not match, and newly registers a current feature map of the parking position manually set by the driver in the storage unit 54. Accordingly, a new parking position different from the designated parking position of the No. 1 image button 62a touched by the driver is newly added and displayed on the automatic parking menu in FIG. 4 as one of registered designated parking positions.

When not receiving the operation of newly registering the map in step S32 (step S32: No), the automatic parking control unit 55 ends the processing of the present automatic parking control without newly registering the feature map. The threshold (%) of the matching rate exemplified in the present automatic parking control is merely an example, and may be changed as appropriate.

When the map is not registered in the corresponding slot in step S20 (step S20: No), as shown in FIG. 12, the automatic parking control unit 55 receives the manual setting performed by the driver for setting the parking position of the vehicle 10 (step S34). In order to inform the driver that the manual setting of the parking position is to be received, the automatic parking control unit 55 displays a top view image similar to that of FIG. 6 on the touch panel 42, and displays, for example, "Data for automatically parking the vehicle is insufficient. Please perform setting." The method for manually setting the parking position is similar to that of step S12 in FIG. 5 described above.

When receiving the manual setting of the parking position 76 in step S34 (see FIG. 6), the automatic parking control unit 55 detects the features related to the designated parking position 76 from the recognition data of the external environment acquired by the front camera 12Fr, the rear camera 12Rr, the left side camera 12L, and the right side camera 12R, and automatically parks the vehicle 10 at the parking position 76 based on the detected features (step S35). The processing of the automatic parking is processing similar to that of step S13 in FIG. 5 described above. For example, the automatic parking control unit 55 detects the building features 77a to 77d, the obstacle features 78a to 78f, and the like related to the designated parking position 76 as shown in FIG. 7.

Next, the automatic parking control unit 55 prompts the driver to newly register a map generated based on the features related to the designated parking position 76 detected in step S35 (step S36). For example, the automatic parking control unit 55 displays the top view image as shown in FIG. 7 on the touch panel 42, and displays "the parking success rate may increase by registering the parking place in a bright scene. Do you perform registration?", "the parking success rate may increase by registering the parking place in a dark scene. Do you perform registration?" or the like. At that time, a "registration button" to be touched in a case of registration and a "non-registration button" to be touched in a case of no registration may be displayed.

Next, the automatic parking control unit 55 determines whether the driver performs the operation of newly registering the map (step S37).

When the operation of newly registering the map is performed in step S37 (step S37: Yes), the automatic parking control unit 55 registers, in the storage unit 54, the map including the features related to the designated parking position 76 detected in step S35 and the parking position manually set in step S34 in association with the slot corresponding to the illuminance calculated in step S19 (step S38).

Accordingly, the slot corresponding to the illuminance and the map showing the features thereof are additionally registered in the correspondence table 81 shown in FIG. 8 provided for the designated parking position of the No. 1 image button 62a.

When the operation of newly registering the map is not performed in step S37 (step S37: No), the automatic parking control unit 55 ends the processing of the present automatic parking control without registering the map.

As described above, the automatic parking control unit 55 of the moving body control device registers the features related to the designated parking position based on the recognition data of the external environment as the registered features, automatically parks the vehicle 10 at the designated parking position based on the recognition data of the external environment and the registered features, and updates the registered features according to the matching rate between the features-during-execution obtained based on the recognition data of the external environment during the execution of the automatic parking and the registered features registered so far.

Figure 14:
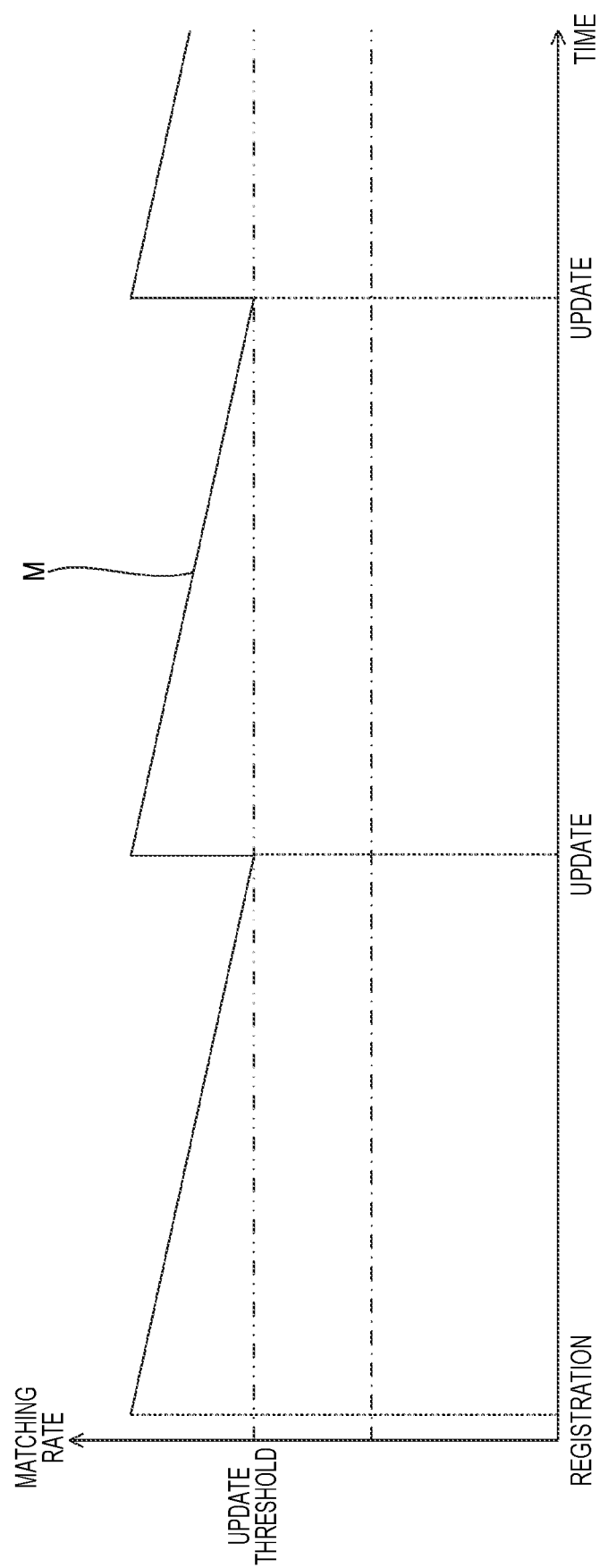
FIG. 14 is a diagram showing the matching rate of the features maintained by automatic update of registered features.

According to the configuration, when the registered features change due to the temporal elapse or the like, the registered features that have been registered may be appropriately updated according to the matching rate. For example, as shown in FIG. 14, in a case where the automatic parking is executed for the designated parking position of the vehicle 10 when the matching rate between the features-during-execution and the registered features is equal to or larger than the threshold for updating, the registered features may be automatically updated, and the high matching rate M may be maintained. Accordingly, even when the appearances of the building and the obstacle (planting) around the designated parking position change due to the temporal elapse or the seasonal changes, the continuous automatic parking control to the designated parking position may be enabled based on the appropriately updated registered features.

When the matching rate between the features obtained during execution of the automatic parking and the registered features is, for example, equal to or larger than 80%, the automatic parking control unit 55 does not update the registered features. When the matching rate between the features obtained during execution of the automatic parking and the registered features is less than 80% and equal to or larger than 60%, the registered features are updated. Accordingly, when the change in the registered features is small, a processing amount of the automatic parking control unit 55 may be reduced by not updating the registered features. When the change in the registered features is large to some extent, the registered features may be updated, and the continuous automatic parking control to the designated parking position may be enabled.

When the matching rate between the features obtained during execution of the automatic parking and the registered features is less than 60% and is equal to or larger than 30%, the automatic parking control unit 55 does not update the registered features. Accordingly, when the features-during-execution temporarily largely change with respect to the registered features due to the heavy rain or the snow, the registered features are not updated and the continuous automatic parking control to the designated parking position at normal times may be enabled. Further, when a parking position currently desired to be parked may be different from the registered designated parking position, it is possible to prevent a situation where the registered features may be erroneously updated by not updating the registered features.

When the matching rate between the features during execution of the automatic parking and the registered features is less than 30%, the automatic parking control unit 55 newly registers the features as registered features. Accordingly, when a parking position desired to be parked is likely to be different from the registered designated parking position, the features are newly registered as the registered features, and the automatic parking control to the parking position desired to be parked may be executed at the next and subsequent parking opportunity.

When the matching rate between the features during execution of the automatic parking and the registered features is less than 30%, the automatic parking control unit 55 receives a selection of whether to newly register the registered features from the user of the vehicle 10. Accordingly, in a case where a parking position desired to be parked is likely to be different from the registered designated parking position, the user may newly register the registered features only when it is necessary to set the parking position as the designated parking position. Accordingly, it is possible to prevent unnecessary new registration of the registered features.

The automatic parking control unit 55 executes the automatic parking of the vehicle 10 based on the registered features when the matching rate between the features obtained during execution of the automatic parking and the registered features is equal to or larger than 60%, and does not execute the automatic parking of the vehicle 10 based on the registered features when the matching rate between the features during execution of the automatic parking and the registered features is less than 60%. Even in a case where the matching rate (equal to or larger than 60%) allows the automatic parking control, the registered features are updated when the matching rate is changed to some extent with respect to the registered features (the matching rate is less than 80%), which may enable the continuous automatic parking control to the designated parking position.

When the registered features change due to the seasonal changes or the like, the automatic parking control unit 55 may update the registered features in consideration of a difference between an illuminance when the registered features are obtained and a current illuminance. For example, the automatic parking control unit 55 specifies corresponding registered features associated with an illuminance within a predetermined range for a current illuminance of the external environment obtained during execution of the automatic parking among the registered features, and updates the corresponding registered features when a matching rate between the corresponding registered features and the features obtained during execution of the automatic parking is within a predetermined range. On the other hand, even when the registered features have a matching rate with the features obtained during execution of the automatic parking within a predetermined range, the automatic parking control unit 55 does not update the registered features corresponding to an illuminance having a large difference from the current illuminance of the external environment. Accordingly, for example, a situation where the registered features corresponding to the "daytime" is overwritten by the features obtained during the nighttime may be prevented, and an illuminance may be appropriately updated according to an illuminance of the external environment.

Figure 15:
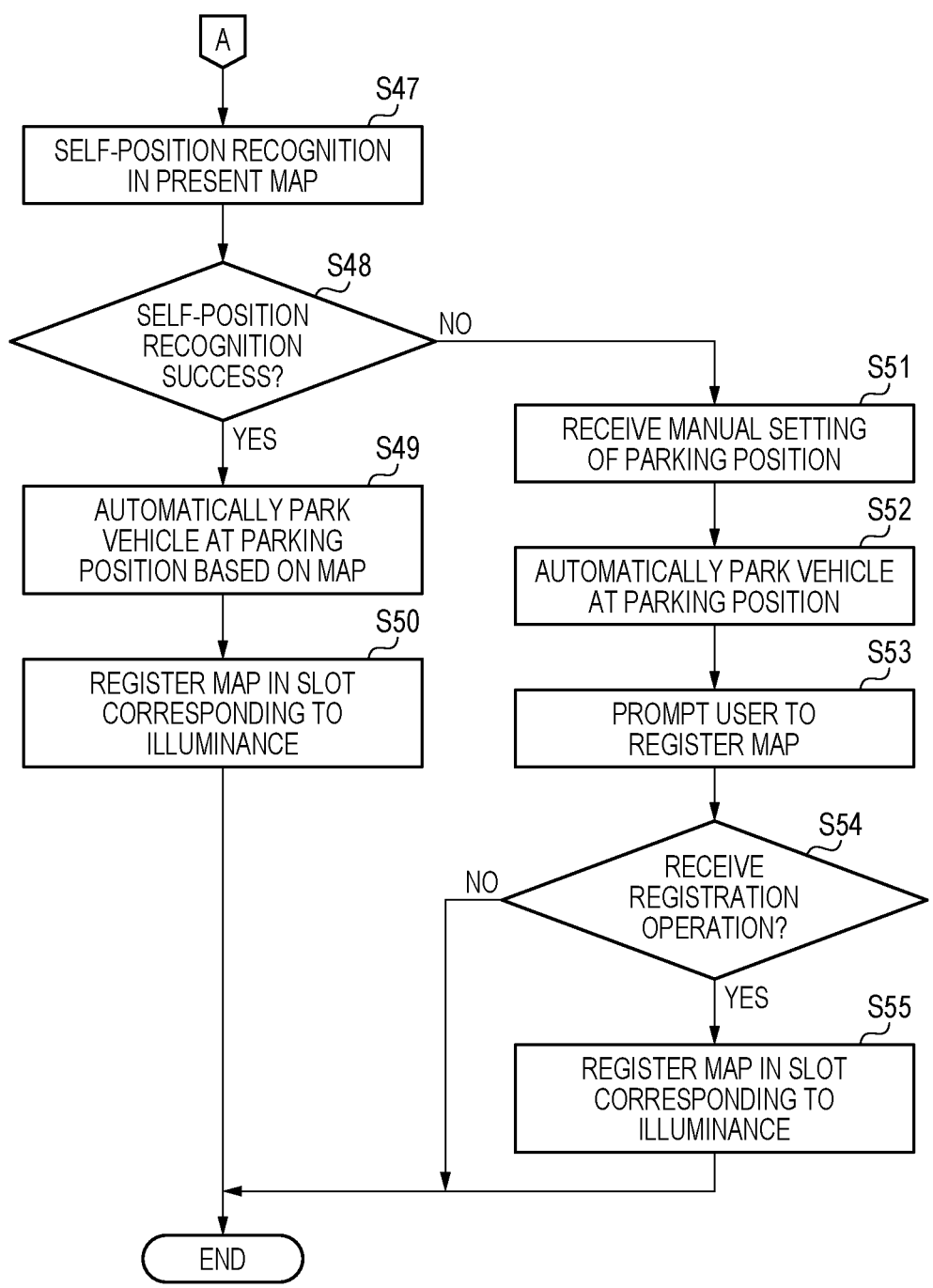
FIG. 15 is a flowchart showing another example of the control when the map is not registered in the corresponding slot in the control in FIG. 11.

FIG. 15 is a flowchart showing another example of the control when the map is not registered in the corresponding slot in the control in FIG. 11. When the map is not registered in the corresponding slot in step S20 in FIG. 11 (step S20: No), the automatic parking control unit 55 may execute processing shown in FIG. 15. First, the automatic parking control unit 55 performs self-position recognition based on any one of slot patterns among other slot patterns in which the map is registered at the designated parking position of the No. 1 image button 62a (step S47). The self-position recognition is processing of estimating a position of the vehicle 10 in a space corresponding to the registered features by determining whether the registered features can be detected from features obtained by current external environment recognition.

Next, the automatic parking control unit 55 determines whether a self-position is recognized in the self-position recognition in step S47 (step S48).

When the self-position is recognized in step S48 (step S48: Yes), the automatic parking control unit 55 automatically parks the vehicle 10 at the designated parking position of the No. 1 image button 62a designated by the driver based on a slot pattern where the self-position may be recognized (step S49). In this automatic parking, the automatic parking control unit 55 detects, for example, the building features 77a to 77d, the obstacle features 78a to 78f, and the like related to the designated parking position 76 as shown in FIG. 7.

Next, the automatic parking control unit 55 registers, in the storage unit 54, a map including the features related to the designated parking position 76 detected in step S49 and the designated parking position of the No. 1 image button 62*a* designated by the driver in association with the slot corresponding to the illuminance calculated in step S19 in FIG. 11 (step S50).

On the other hand, when the self-position cannot be recognized in step S48 (step S48: No), the automatic parking control unit 55 receives the manual setting performed by the driver for setting the parking position of the vehicle 10 (step S51). The processing from step S51 to step S55 is processing similar to the processing from step S34 to step S38 of the automatic parking control shown in FIG. 12. Therefore, description about from step S51 to step S55 is omitted.

As described above, when the map including the features related to the designated parking position is not present in the slot corresponding to the illuminance acquired from the recognition data of the external environment during execution of the automatic parking control to the designated parking position, the automatic parking control unit 55 of the modification performs the automatic parking control of the vehicle 10 to the designated parking position based on any one of slot patterns among other slot patterns where the map is present. Accordingly, even when the slot pattern including the map corresponding to a current illuminance of the external environment of the vehicle 10 is not present, the automatic parking control may be executed, and an execution frequency of the automatic parking control may be improved.

When the self-position of the vehicle 10 cannot be recognized even based on any one of a plurality of slot patterns including maps, the automatic parking control unit 55 receives the manual setting of the parking position for designating a predetermined parking position by the user of the vehicle 10. Accordingly, a slot pattern based on a current illuminance may be newly registered for the designated parking position, and automatic parking control including a new slot pattern may be executed at the next and subsequent parking opportunity.

Figure 16:
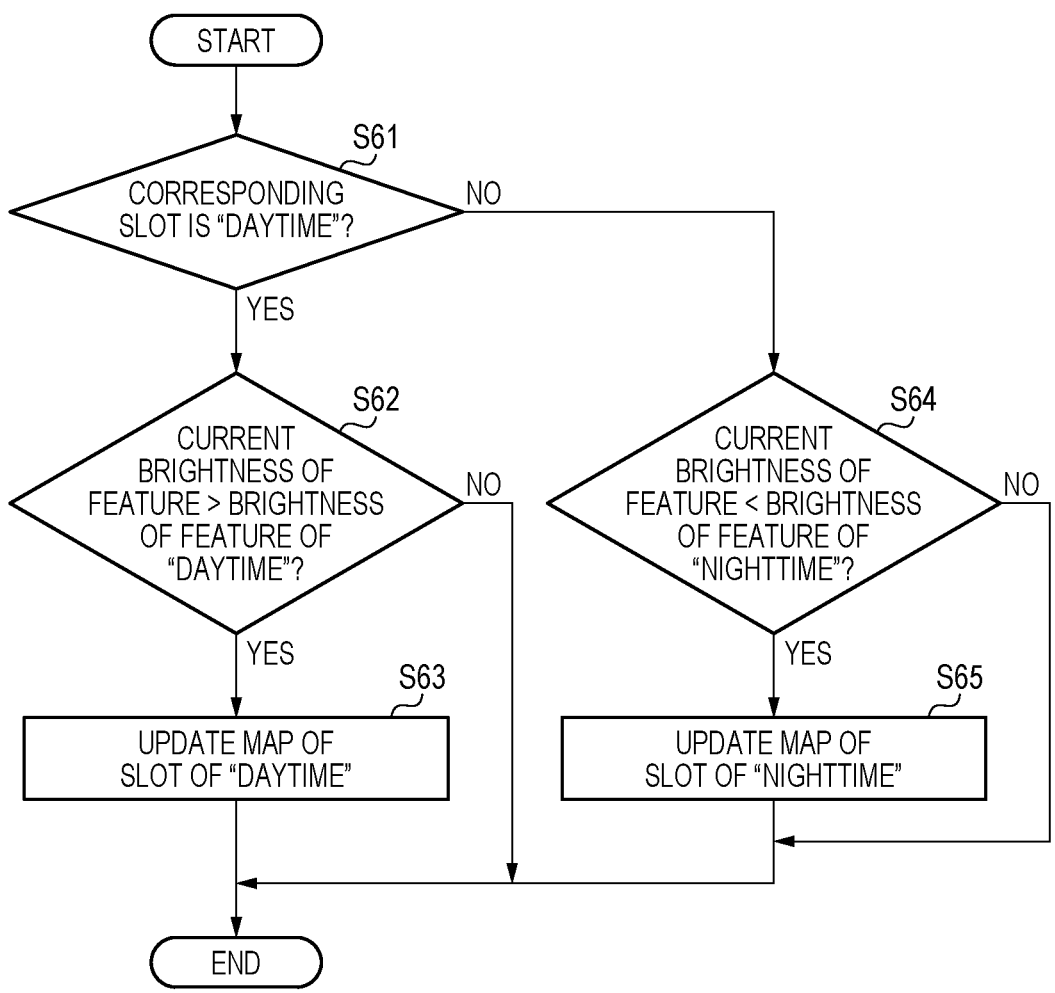
FIG. 16 illustrates an example of map update based on comparison of brightness.

FIG. 16 shows an example of the map update based on comparison of brightness. The automatic parking control unit 55 may execute, for example, the processing shown in FIG. 16 when updating the map (for example, step S26 in FIG. 11). Here, for example, as in the example shown in FIG. 8, it is assumed that there are the slot of the "daytime" and the slot of the "nighttime" in the correspondence table 81. The "map a" in the slot of the "daytime" shows an example of a first registered feature associated with a first illuminance. The "map b" in the slot of the "nighttime" shows an example of a second registered feature associated with a second illuminance lower than the first illuminance.

First, the automatic parking control unit 55 determines whether a slot of a map to be updated (a slot corresponding to a current illuminance) is the slot of the "daytime" (step S61). When the slot of the map to be updated is the slot of the "daytime" (step S61: Yes), the automatic parking control unit 55 determines whether brightness of a current feature is larger than brightness of a feature of the slot of the "daytime" (step S62). The brightness of the current feature is a representative value (for example, an average value) of brightness of one or more features obtained during the automatic parking. The brightness of the feature of the slot is a representative value (for example, an average value) of brightness of one or more features included in a map registered in association with the slot.

When the brightness of the current feature is larger than the brightness of the feature of the slot of the "daytime" in step S62 (step S62: Yes), the automatic parking control unit 55 updates the map of the slot of the "daytime" according to the current feature (step S63), and ends a series of processing. When the brightness of the current feature is equal to or smaller than the brightness of the feature of the slot of the "daytime" (step S62: No), the automatic parking control unit 55 ends the series of processing without updating the map of the slot of the "daytime".

When the slot of the map to be updated is not the slot of the "daytime" in step S61 (step S61: No), that is, when the slot of the map to be updated is the slot of the "nighttime", the automatic parking control unit 55 determines whether the brightness of the current feature is smaller than brightness of the feature of the slot of the "nighttime" (step S64).

When the brightness of the current feature is smaller than the brightness of the feature of the slot of the "nighttime" in step S64 (step S64: Yes), the automatic parking control unit 55 updates the map of the slot of the "nighttime" according to the current feature (step S65), and ends the series of processing. When the brightness of the current feature is equal to or larger than the brightness of the feature of the slot of the "nighttime" (step S64: No), the automatic parking control unit 55 ends the series of processing without updating the map of the slot of the "nighttime".

As described with reference to FIG. 16, even when a matching rate between the illuminance of the external environment obtained based on the recognition data of the external environment during execution of the automatic parking and the first illuminance (the illuminance associated with the feature of the slot of the "daytime") is within a predetermined range, when the brightness of the feature obtained based on the recognition data of the external environment during execution of the automatic parking is equal to or smaller than the brightness of the first registered feature (the "map a" of the slot of the "daytime"), the automatic parking control unit 55 may not update the first registered feature. Further, even when a matching rate between the illuminance of the external environment obtained based on the recognition data of the external environment during execution of the automatic parking and the second illuminance (the illuminance associated with the feature of the slot of the "nighttime") is within a predetermined range, when the brightness of the feature obtained based on the recognition data of the external environment during execution of the automatic parking is equal to or larger than the brightness of the second registered feature (the "map b" of the slot of the "nighttime"), the automatic parking control unit 55 may not update the second registered feature.

Accordingly, it is possible to prevent a difference between the first registered feature corresponding to a high illuminance (for example, the daytime) and the second registered feature corresponding to a low illuminance (for example, the nighttime) from becoming small due to the update of the registered feature, and to prevent a situation where the automatic parking based on the registered feature becomes difficult.

Figure 17:
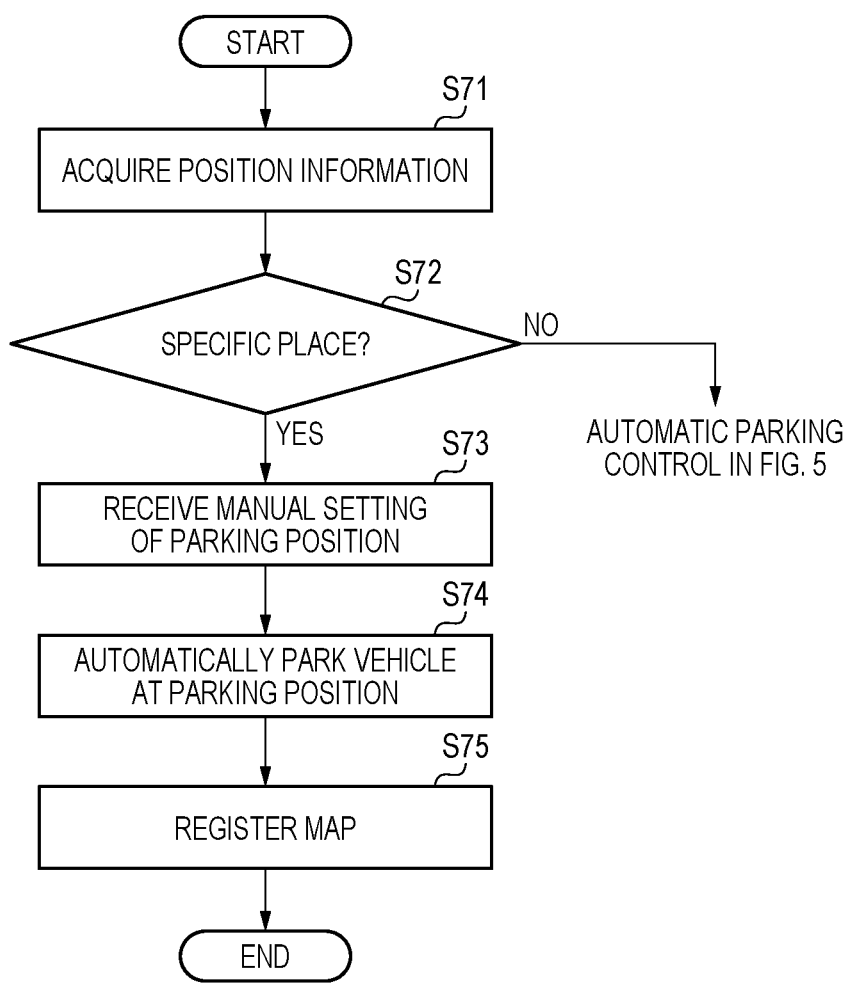
FIG. 17 is a flowchart showing automatic parking control for parking the vehicle 10 at a new parking position according to a position of the vehicle 10.

FIG. 17 is a flowchart showing automatic parking control for parking the vehicle 10 at a new parking position according to a position of the vehicle 10. When the new registration button 61 is touched, the automatic parking control unit 55 may start processing shown in FIG. 17.

First, the automatic parking control unit 55 acquires position information of the vehicle 10 (step S71). For example, the automatic parking control unit 55 acquires the position information of the vehicle 10 by using GPS, analysis of a captured image, an odometry, or the like of the vehicle 10.

Next, the automatic parking control unit 55 determines whether a position indicated by the position information acquired in step S71 is a specific place (step S72). The specific place is, for example, a place where the illuminance changes a little due to a time period such as a preset underground parking lot or a multilevel parking lot (indoor parking lot). The specific place may be set by the user. When the position is not the specific place (step S72: No), the automatic parking control unit 55 shifts to the automatic parking control shown in FIG. 5.

When the position is the specific place in step S72 (step S72: Yes), the automatic parking control unit 55 shifts to step S73. Steps S73 to S75 are processing similar to steps S12 to S14 shown in FIG. 5. However, in step S75, the automatic parking control unit 55 registers a map including features related to the designated parking position 76 detected in step S74 and the parking position 76 set in step S12 not in association with the illuminance or the slot (step S75).

Figure 18:
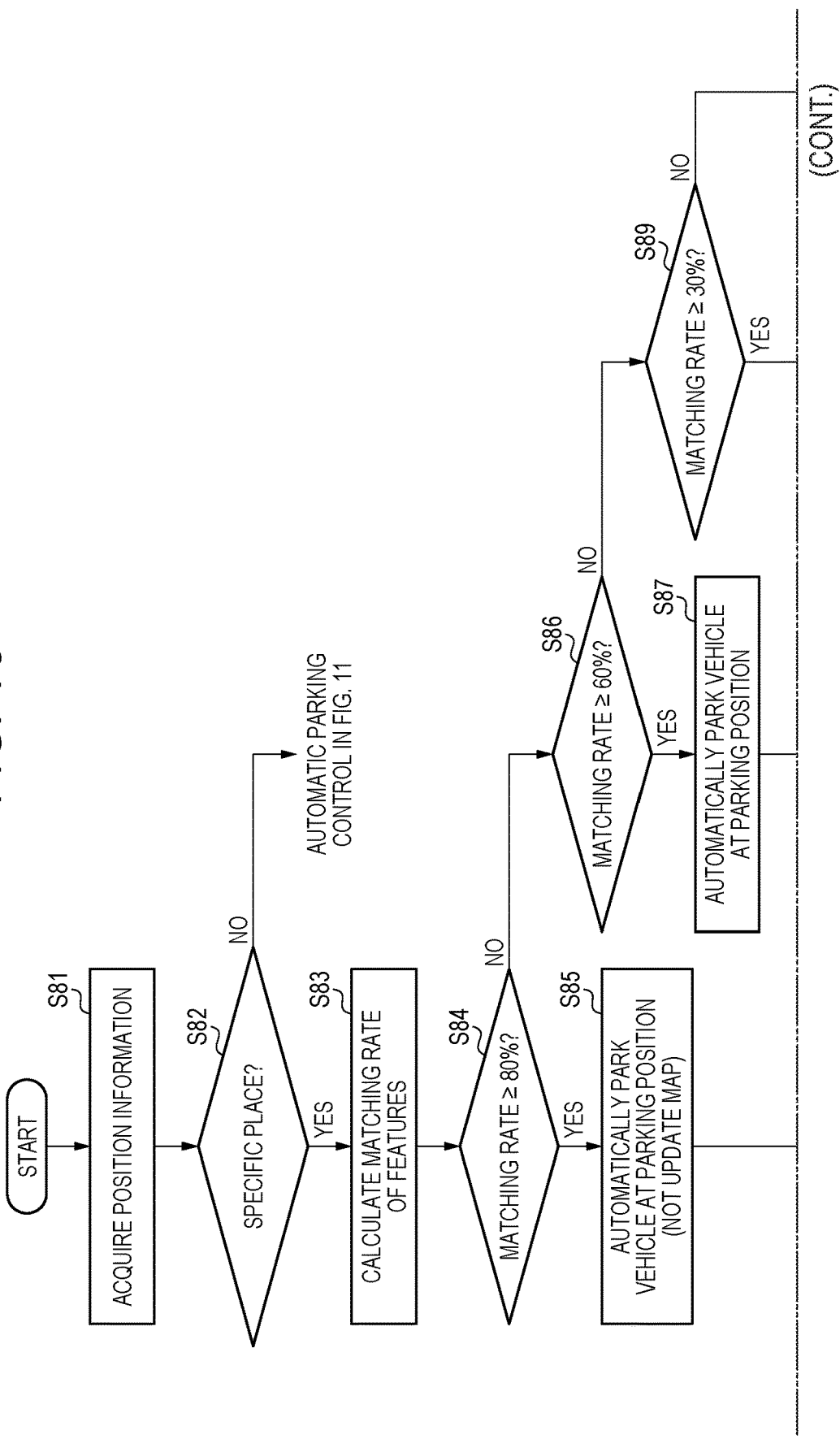
FIG. 18 is a flowchart showing an example of automatic parking control for parking the vehicle 10 at a registered parking position according to a position of the vehicle 10.

FIG. 18 is a flowchart showing an example of automatic parking control for parking the vehicle 10 at a registered parking position according to a position of the vehicle 10. When the registered parking position image button 62 of the automatic parking menu shown in FIG. 4 is touched, the automatic parking control unit 55 may start processing in FIG. 18.

First, as in step S71 in FIG. 17, the automatic parking control unit 55 acquires position information of the vehicle 10 (step S81). For example, the automatic parking control unit 55 acquires the position information of the vehicle 10 by using GPS, analysis of a captured image, an odometry, or the like of the vehicle 10.

Next, as in step S72 in FIG. 17, the automatic parking control unit 55 determines whether a position indicated by the position information acquired in step S81 is a specific place (step S82). The specific place is the place described in step S72 in FIG. 17. When the position is not the specific place (step S82: No), the automatic parking control unit 55 shifts to the automatic parking control shown in FIG. 11.

When the position is the specific place in step S82 (step S82: Yes), the automatic parking control unit 55 shifts to step S83. Steps S83 to S95 are processing similar to steps S21 to S33 shown in FIG. 11. However, in step S88, the automatic parking control unit 55 updates a feature map representing registered features registered so far for the designated parking position designated by the driver (a feature map not associated with the illuminance or the slot) with a feature map representing the features-during-execution (step S88). Further, in step S95, the automatic parking control unit 55 newly registers the feature map representing the features-during-execution acquired in step S83 regardless of the illuminance and the slot as a feature map of a newly designated parking position regardless of the slot (step S95).

As described with reference to FIGS. 17 and 18, when the vehicle 10 is located at the specific place, the automatic parking control unit 55 may register the registered features without associating with the illuminance of the external environment obtained based on the recognition data of the external environment when the registered features are obtained. In this case, when the vehicle 10 is located at the specific place, the automatic parking control unit 55 updates the registered features according to a matching rate between features obtained based on the recognition data of the external environment during execution of the automatic parking control and the registered features regardless of a matching rate between the illuminance of the external environment during execution of the automatic parking control and an illuminance of the external environment when the registered features are obtained. Accordingly, the determination based on the illuminance is not performed at the specific place where the illuminance changes a little (for example, the underground parking lot), so that the features may be appropriately registered and updated more efficiently.

The embodiment of the present disclosure has been described above, but the present disclosure is not limited to the embodiment described above, and modifications, improvements, and the like may be made as appropriate.

For example, in the embodiment described above, a case where the vehicle 10 is automatically parked by the automatic steering of the automatic parking control unit 55 has been described, but the present disclosure is not limited thereto. For example, the present disclosure may be applied to parking assistance for performing a support when the vehicle 10 is parked by an operation of the driver.

In the embodiment described above, the parking position of the vehicle 10, and the features of the parking position and surroundings have been described using the top view images (combined images) of the front camera 12Fr, the rear camera 12Rr, the left side camera 12L, and the right side camera 12R, but the present disclosure is not limited thereto. For example, description may be made using an image captured by any one of the front camera 12Fr, the rear camera 12Rr, the left side camera 12L, and the right side camera 12R.

In the embodiment described above, a case where the automatic parking control unit 55 displays the top view image 71 or the like on the touch panel 42 of the vehicle 10 has been described, but the present disclosure is not limited thereto. For example, the automatic parking control unit 55 may display the top view image 71 or the like on a display screen of an information terminal (for example, a smartphone) carried by the passenger of the vehicle 10 via the communication unit 24.

In the embodiment described above, a case where information such as the feature map representing the registered features of the designated parking position, and the slot based on the illuminance of the external environment is registered in the storage unit 54 of the vehicle 10 has been described, but the present disclosure is not limited thereto. For example, the information may be registered in a storage unit of another device such as a smartphone or a server communicably connected to the vehicle 10.

In the embodiment described above, the slots are classified into the slots of the "daytime" and the "nighttime" according to the illuminance of the external environment, but the present disclosure is not limited thereto. For example, the slots may be classified into slots of "high" and "low" according to a level of direct illuminance. Further, the slots may be classified into three or more types of slots such as "high", "medium", and "low".

In the embodiment described above, a case where the user touches the registered parking position image button 62 (a case where the No. 1 image button 62a in FIG. 4 is selected and touched) when parking the vehicle 10 at the registered parking position has been described, but the present disclosure is not limited thereto. For example, in a case where the user touches the automatic parking button 60 displayed on the touch panel 42 when automatically parking the vehicle 10, the automatic parking control unit 55 may automatically determine in which parking position the vehicle is to be parked this time by comparing the top view image captured during execution of the automatic parking with the registered top view image, and for example, start the processing in FIG. 12. Accordingly, an operation, by the user of the vehicle 10, of finding and selecting a button for a parking position to be parked this time based on the registered parking position image button 62 may be eliminated.

In the embodiment described above, an example in which the moving body is a vehicle (four-wheeled automobile) has been described, but the present disclosure is not limited thereto. For example, a vehicle such as a two-wheeled vehicle or a Segway may be used. Further, the idea of the present disclosure is not limited to the vehicle, and may also be applied to a robot, a ship, an aircraft, or the like that includes a drive source and that may be moved by power of the drive source.

The moving body control method described in the embodiment described above may be implemented by executing a moving body control program prepared in advance by a computer. The present moving body control program is stored in a computer-readable storage medium and executed by being read from the storage medium. Further, the present moving body control program may be provided in a form stored in a non-transitory storage medium such as a flash memory, or may be provided via a network such as the Internet. The computer that executes the present moving body control program may be provided in the moving body control device, may be provided in an electronic device such as a smartphone, a tablet terminal, or a personal computer that is communicable with the moving body control device, or may be provided in a server device that is communicable with the moving body control device and the electronic device.

In the present specification, at least the following matters are described. Corresponding components and the like in the embodiment described above are shown in parentheses, but the present invention is not limited thereto.

(1) A moving body control device including:
an external environment recognition unit (front camera 12Fr, rear camera 12Rr, left side camera 12L, and right side camera 12R) configured to acquire recognition data of an external environment of a moving body (vehicle 10);
a reception unit (touch panel 42) configured to receive designation of a predetermined parking position from a user of the moving body; and
a control unit (automatic parking control unit 55) configured to perform automatic parking control for parking the moving body at the predetermined parking position based on the recognition data of the external environment and the predetermined parking position, and to register the predetermined parking position as a designated parking position,
in which the control unit registers a feature related to the designated parking position based on the recognition data of the external environment as a registered feature, and performs the automatic parking control for parking the moving body at the designated parking position based on the recognition data of the external environment and the registered feature, and
the control unit updates the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to (1), when the registered feature changes due to seasonal changes or the like, the registered feature that has been registered may be updated. Further, even when the illuminance of the external environment of the moving body changes due to a time period (daytime, nighttime, or the like), weather (clear, cloudy, or the like), or the like, the registered feature may be updated in consideration of a difference in the illuminance. Therefore, an automatic parking control to the designated parking position may be performed continuously.

(2) The moving body control device according to (1),
in which the control unit updates the registered feature when the matching rate between the feature obtained based on the recognition data of the external environment during execution of the automatic parking control and the registered feature is within a predetermined range, and the matching rate between the illuminance of the external environment obtained based on the recognition data of the external environment during execution of the automatic parking control and the illuminance associated with the registered feature is within a predetermined range.

According to (2), an appropriate feature may be selected according to the illuminance of the external environment of the moving body, and accuracy of the automatic parking control may be improved.

(3) The moving body control device according to (2),
in which the control unit registers the registered feature in association with the illuminance of the external environment obtained based on the recognition data of the external environment when the registered feature is obtained,
the control unit specifies, among the registered features, a corresponding registered feature associated with an illuminance within a predetermined range for the illuminance of the external environment obtained based on the recognition data of the external environment during execution of the automatic parking control, and
the control unit updates the corresponding registered feature when a matching rate between the feature obtained based on the recognition data of the external environment during execution of the automatic parking control and the corresponding registered feature is within a predetermined range.

According to (3), an appropriate feature may be selected according to the illuminance of the external environment of the moving body, and accuracy of the automatic parking control may be improved.

(4) The moving body control device according to (3),
in which, when the corresponding registered feature is not present, the control unit performs the automatic parking control to the designated parking position based on any one of the registered features.

According to (4), even when the feature corresponding to the current illuminance of the external environment of the moving body is not present, the automatic parking control may be executed, and an execution frequency of the automatic parking control may be improved.

(5) The moving body control device according to (4),
in which, when self-position recognition of the moving body is not performed based on any one of the registered features, the control unit receives designation of a predetermined parking position from the user of the moving body.

According to (5), the feature based on the current illuminance may be newly registered, and the automatic parking control may be executed at the next and subsequent parking opportunity.

(6) The moving body control device according to any one of (1) to (5), in which the control unit registers a first registered feature associated with a first illuminance and a second registered feature associated with a second illuminance lower than the first illuminance, the control unit does not update the first registered feature when a matching rate between the illuminance of the external environment obtained based on the recognition data of the external environment during execution of the automatic parking control and the first illuminance is within a predetermined range, and when brightness of the feature obtained based on the recognition data of the external environment during execution of the automatic parking control is equal to or smaller than brightness of the first registered feature, and the control unit does not update the second registered feature when a matching rate between the illuminance of the external environment obtained based on the recognition data of the external environment during execution of the automatic parking control and the second illuminance is within a predetermined range, and when the brightness of the feature obtained based on the recognition data of the external environment during execution of the automatic parking control is equal to or larger than brightness of the second registered feature.

According to (6), it is possible to prevent a difference between the first registered feature corresponding to a high illuminance (for example, daytime) and the second registered feature corresponding to a low illuminance (for example, nighttime) from becoming small due to the update of the registered feature, and to prevent a situation where the automatic parking control based on the registered feature becomes difficult.

(7) The moving body control device according to any one of (1) to (6), in which, when the moving body is located at a specific place, the control unit registers the registered feature not in association with the illuminance of the external environment obtained based on the recognition data of the external environment when the registered feature is obtained, and updates the registered feature according to the matching rate between the feature obtained based on the recognition data of the external environment during execution of the automatic parking control and the registered feature regardless of a matching rate between the illuminance of the external environment during execution of the automatic parking control and an illuminance of the external environment when the registered feature is obtained.

According to (7), determination based on the illuminance is not performed at the specific place where the illuminance changes a little (for example, an underground parking lot), so that the feature may be appropriately registered and updated more efficiently.

(8) The moving body control device according to any one of (1) to (7), in which the control unit does not update the registered feature when the matching rate between the feature obtained based on the recognition data of the external environment during execution of the automatic parking control and the registered feature is equal to or larger than a first threshold, and the control unit updates the registered feature when the matching rate between the feature obtained based on the recognition data of the external environment during execution of the automatic parking control and the registered feature is less than the first threshold.

According to (8), when a change in the registered feature is small, a processing amount may be reduced by not updating the registered feature. When the change in the registered feature is large, the registered feature may be updated, and the continuous automatic parking control to the designated parking position may be performed.

(9) The moving body control device according to (8), wherein the control unit does not update the registered feature when the matching rate between the feature obtained based on the recognition data of the external environment during execution of the automatic parking control and the registered feature is less than a second threshold that is lower than the first threshold, even when the matching rate between the feature obtained based on the recognition data of the external environment during execution of the automatic parking control and the registered feature is less than the first threshold.

According to (9), when the change in the registered feature is excessively large, for example, due to temporal heavy snow, the registered feature is not update to enable the continuous automatic parking control to the designated parking position at normal times. Further, when a parking position currently desired to be parked may be different from the registered designated parking position, it is possible to prevent a situation where the registered features may be erroneously updated by not updating the registered features.

(10) The moving body control device according to (9), in which the control unit performs control of newly registering the registered feature when the matching rate between the feature obtained based on the recognition data of the external environment during execution of the automatic parking control and the registered feature is less than a third threshold that is lower than the second threshold.

According to (10), in a case where a parking position desired to be parked may be different from the registered designated parking position, new registration of the feature as the registered feature is performed and the automatic parking control to the parking position desired to be parked may be enabled at the next and subsequent parking opportunity.

(11) The moving body control device according to (10), in which the control unit receives a selection of whether to newly register the registered feature from a user of the moving body when the matching rate between the feature obtained based on the recognition data of the external environment during execution of the automatic parking control and the registered feature is less than the third threshold.

According to (11), in a case where the parking position desired to be parked may be different from the registered designated parking position, since the user may newly register the registered feature only when it is necessary to set the parking position as the designated parking position, it is possible to prevent unnecessary new registration of the registered feature.

(12) The moving body control device according to any one of (9) to (11), wherein the control unit executes the automatic parking control based on the registered feature when the matching rate between the feature obtained based on the recognition data of the external environment during execution of the automatic parking control and the registered feature is equal to or larger than the second threshold, and the control unit does not execute the automatic parking control based on the registered feature when the matching rate between the feature obtained based on the recognition data of the external environment during execution of the automatic parking control and the registered feature is less than the second threshold.

According to (12), even at the matching rate at which the automatic parking control is possible (equal to or larger than the second threshold), when the change in the registered feature is large (the matching rate is less than the first threshold), the registered feature may be updated, and the continuous automatic parking control to the designated parking position may be performed.

(13) A moving body control method including:
by a processor of a moving body control device,
acquiring recognition data of an external environment of a moving body;
receiving designation of a predetermined parking position from a user of the moving body;
performing automatic parking control for parking the moving body at the predetermined parking position based on the recognition data of the external environment and the predetermined parking position, and registering the predetermined parking position as a designated parking position;
registering a feature related to the designated parking position based on the recognition data of the external environment as a registered feature, and performing the automatic parking control for parking the moving body at the designated parking position based on the recognition data of the external environment and the registered feature; and
updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to (13), when the registered feature changes due to seasonal changes or the like, the registered feature that has been registered may be updated. Further, even when the illuminance of the external environment of the moving body changes due to a time period (daytime, nighttime, or the like), weather (clear, cloudy, or the like), or the like, the registered feature may be updated in consideration of a difference in the illuminance. Therefore, an automatic parking control to the designated parking position may be performed continuously.

(14) A non-transitory computer readable storage medium storing a moving body control program causing a processor of a moving body control device to execute processing, the processing including:
acquiring recognition data of an external environment of a moving body;
receiving designation of a predetermined parking position from a user of the moving body;
performing automatic parking control for parking the moving body at the predetermined parking position based on the recognition data of the external environment and the predetermined parking position, and registering the predetermined parking position as a designated parking position;
registering a feature related to the designated parking position based on the recognition data of the external environment as a registered feature, and performing the automatic parking control for parking the moving body at the designated parking position based on the recognition data of the external environment and the registered feature; and
updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

According to (14), when the registered feature changes due to seasonal changes or the like, the registered feature that has been registered may be updated. Further, even when the illuminance of the external environment of the moving body changes due to a time period (daytime, nighttime, or the like), weather (clear, cloudy, or the like), or the like, the registered feature may be updated in consideration of a difference in the illuminance. Therefore, an automatic parking control to the designated parking position may be performed continuously.

What is claimed is:

1. A moving body control device comprising:
circuitry configured to
acquire recognition data of an external environment of a moving body;
receive designation of a predetermined parking position from a user of the moving body; and
perform automatic parking control for parking the moving body at the predetermined parking position based on the recognition data of the external environment and the predetermined parking position, and to register the predetermined parking position as a designated parking position,
wherein the circuitry registers a feature related to the designated parking position based on the recognition data of the external environment as a registered feature, and performs the automatic parking control for parking the moving body at the designated parking position based on the recognition data of the external environment and the registered feature, and
the circuitry updates the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

2. The moving body control device according to claim 1, wherein the circuitry updates the registered feature when the matching rate between the feature obtained based on the recognition data of the external environment during execution of the automatic parking control and the registered feature is within a predetermined range, and the matching rate between the illuminance of the external environment obtained based on the recognition data of the external environment during execution of the automatic parking control and the illuminance associated with the registered feature is within a predetermined range.

3. The moving body control device according to claim 2, wherein the circuitry registers the registered feature in association with the illuminance of the external environment obtained based on the recognition data of the external environment when the registered feature is obtained, the circuitry specifies, among the registered features, a corresponding registered feature associated with an illuminance within a predetermined range for the illuminance of the external environment obtained based on the recognition data of the external environment during execution of the automatic parking control, and the circuitry updates the corresponding registered feature when a matching rate between the feature obtained based on the recognition data of the external environment during execution of the automatic parking control and the corresponding registered feature is within a predetermined range.

4. The moving body control device according to claim 3, wherein, when the corresponding registered feature is not present, the circuitry performs the automatic parking control to the designated parking position based on any one of the registered features.

5. The moving body control device according to claim 4, wherein, when self-position recognition of the moving body is not performed based on any one of the registered features, the circuitry receives designation of a predetermined parking position from the user of the moving body.

6. The moving body control device according to claim 1, wherein the circuitry registers a first registered feature associated with a first illuminance and a second registered feature associated with a second illuminance lower than the first illuminance, the circuitry does not update the first registered feature when a matching rate between the illuminance of the external environment obtained based on the recognition data of the external environment during execution of the automatic parking control and the first illuminance is within a predetermined range, and when brightness of the feature obtained based on the recognition data of the external environment during execution of the automatic parking control is equal to or smaller than brightness of the first registered feature, and the circuitry does not update the second registered feature when a matching rate between the illuminance of the external environment obtained based on the recognition data of the external environment during execution of the automatic parking control and the second illuminance is within a predetermined range, and when the brightness of the feature obtained based on the recognition data of the external environment during execution of the automatic parking control is equal to or larger than brightness of the second registered feature.

7. The moving body control device according to claim 1, wherein, when the moving body is located at a specific place, the circuitry registers the registered feature not in association with the illuminance of the external environment obtained based on the recognition data of the external environment when the registered feature is obtained, and updates the registered feature according to the matching rate between the feature obtained based on the recognition data of the external environment during execution of the automatic parking control and the registered feature regardless of a matching rate between the illuminance of the external environment during execution of the automatic parking control and an illuminance of the external environment when the registered feature is obtained.

8. The moving body control device according to claim 1, wherein the circuitry does not update the registered feature when the matching rate between the feature obtained based on the recognition data of the external environment during execution of the automatic parking control and the registered feature is equal to or larger than a first threshold, and the circuitry updates the registered feature when the matching rate between the feature obtained based on the recognition data of the external environment during execution of the automatic parking control and the registered feature is less than the first threshold.

9. The moving body control device according to claim 8, wherein the circuitry does not update the registered feature when the matching rate between the feature obtained based on the recognition data of the external environment during execution of the automatic parking control and the registered feature is less than a second threshold that is lower than the first threshold, even when the matching rate between the feature obtained based on the recognition data of the external environment during execution of the automatic parking control and the registered feature is less than the first threshold.

10. The moving body control device according to claim 9, wherein the circuitry performs control of newly registering the registered feature when the matching rate between the feature obtained based on the recognition data of the external environment during execution of the automatic parking control and the registered feature is less than a third threshold that is lower than the second threshold.

11. The moving body control device according to claim 10, wherein the circuitry receives a selection of whether to newly register the registered feature from a user of the moving body when the matching rate between the feature obtained based on the recognition data of the external environment during execution of the automatic parking control and the registered feature is less than the third threshold.

12. The moving body control device according to claim 9, wherein the circuitry executes the automatic parking control based on the registered feature when the matching rate between the feature obtained based on the recognition data of the external environment during execution of the automatic parking control and the registered feature is equal to or larger than the second threshold, and the circuitry does not execute the automatic parking control based on the registered feature when the matching rate between the feature obtained based on the recognition data of the external environment during execution of the automatic parking control and the registered feature is less than the second threshold.

13. A moving body control method comprising:
by a processor of a moving body control device,
acquiring recognition data of an external environment of a moving body;

receiving designation of a predetermined parking position from a user of the moving body;
performing automatic parking control for parking the moving body at the predetermined parking position based on the recognition data of the external environment and the predetermined parking position, and registering the predetermined parking position as a designated parking position;
registering a feature related to the designated parking position based on the recognition data of the external environment as a registered feature, and performing the automatic parking control for parking the moving body at the designated parking position based on the recognition data of the external environment and the registered feature; and
updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

14. A non-transitory computer readable storage medium storing a moving body control program causing a processor of a moving body control device to execute processing, the processing comprising:

acquiring recognition data of an external environment of a moving body;
receiving designation of a predetermined parking position from a user of the moving body;
performing automatic parking control for parking the moving body at the predetermined parking position based on the recognition data of the external environment and the predetermined parking position, and registering the predetermined parking position as a designated parking position;
registering a feature related to the designated parking position based on the recognition data of the external environment as a registered feature, and performing the automatic parking control for parking the moving body at the designated parking position based on the recognition data of the external environment and the registered feature; and
updating the registered feature according to a matching rate between a feature obtained based on the recognition data of the external environment during execution of the automatic parking control and the registered feature, and a matching rate between an illuminance of the external environment obtained based on the recognition data of the external environment during execution of the automatic parking control and an illuminance associated with the registered feature.

* * * * *